United States Patent
Heo et al.

(10) Patent No.: US 12,301,911 B2
(45) Date of Patent: May 13, 2025

(54) DISPLAY DEVICE AND CONTROL METHOD THEREFOR

(71) Applicant: LG ELECTRONICS INC., Seoul (KR)

(72) Inventors: Seunghyun Heo, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 17/637,742

(22) PCT Filed: Sep. 3, 2019

(86) PCT No.: PCT/KR2019/011309
§ 371 (c)(1),
(2) Date: Feb. 23, 2022

(87) PCT Pub. No.: WO2021/045243
PCT Pub. Date: Mar. 11, 2021

(65) Prior Publication Data
US 2022/0286726 A1    Sep. 8, 2022

(51) Int. Cl.
*H04N 7/173*     (2011.01)
*G10L 15/18*     (2013.01)
(Continued)

(52) U.S. Cl.
CPC ... *H04N 21/42203* (2013.01); *G10L 15/1815* (2013.01); *G10L 15/22* (2013.01);
(Continued)

(58) Field of Classification Search
CPC ........... H04N 21/42203; H04N 21/437; H04N 21/472; H04N 21/4828; G10L 15/1815;
(Continued)

(56) References Cited

U.S. PATENT DOCUMENTS

2006/0287846 A1* 12/2006 Ollason ................... G10L 15/19
704/4
2011/0313775 A1* 12/2011 Laligand ........ H04N 21/234336
704/E11.001
(Continued)

FOREIGN PATENT DOCUMENTS

JP       2012170102     9/2012
KR    1020160063103    6/2016
(Continued)

OTHER PUBLICATIONS

PCT International Application No. PCT/KR2019/011309, International Search Report dated May 25, 2020, 3 pages.

*Primary Examiner* — Annan Q Shang
(74) *Attorney, Agent, or Firm* — LEE, HONG, DEGERMAN, KANG & WAIMEY

(57) ABSTRACT

A display device comprises a network interface, a memory, a display unit, and a control unit. When speech is received while a content image is displayed through a content provider application, the control unit controls the network interface so as to transmit, to a content provider that provided the content provider application, request information corresponding to the speech.

12 Claims, 19 Drawing Sheets

(51) Int. Cl.
*G10L 15/22*   (2006.01)
*G10L 15/30*   (2013.01)
*H04N 21/422*   (2011.01)
*H04N 21/437*   (2011.01)
*H04N 21/472*   (2011.01)
*H04N 21/482*   (2011.01)
*G10L 15/08*   (2006.01)

(52) U.S. Cl.
CPC ........... *G10L 15/30* (2013.01); *H04N 21/437* (2013.01); *H04N 21/472* (2013.01); *H04N 21/4828* (2013.01); *G10L 2015/088* (2013.01); *G10L 2015/223* (2013.01)

(58) Field of Classification Search
CPC ... G10L 15/22; G10L 15/30; G10L 2015/088; G10L 2015/223; G10L 15/1822; G06F 3/16
See application file for complete search history.

(56) References Cited

U.S. PATENT DOCUMENTS

| | | | | |
|---|---|---|---|---|
| 2012/0075490 A1* | 3/2012 | Tsai | ..................... | G11B 27/034 348/222.1 |
| 2012/0078626 A1* | 3/2012 | Tsai | ..................... | G10L 15/26 704/235 |
| 2012/0078712 A1* | 3/2012 | Fontana | ................ | H04N 21/854 386/E5.025 |
| 2014/0129942 A1* | 5/2014 | Rathod | ............. | H04N 21/44226 715/720 |
| 2015/0189362 A1* | 7/2015 | Lee | .......................... | G06F 3/167 725/38 |
| 2015/0317678 A1* | 11/2015 | Huang | ............... | G06Q 30/0256 705/14.54 |
| 2016/0092447 A1* | 3/2016 | Venkataraman | ....... | G06F 16/735 707/765 |
| 2016/0378277 A1* | 12/2016 | Cho | ..................... | G06F 3/04886 715/814 |
| 2019/0019504 A1* | 1/2019 | Hatambeiki | ............. | G10L 15/20 |
| 2019/0042285 A1* | 2/2019 | Shin | ........................ | G06F 3/167 |
| 2019/0287519 A1* | 9/2019 | Ediz | ............. | G06F 40/30 |
| 2019/0310824 A1* | 10/2019 | Sung | ................ | G10L 15/22 |
| 2019/0355345 A1* | 11/2019 | Fu | ........................ | G10L 15/005 |
| 2020/0112771 A1* | 4/2020 | Kim | ..................... | H04N 21/435 |
| 2020/0294506 A1* | 9/2020 | Ward | ................... | G10L 15/1822 |
| 2021/0383811 A1* | 12/2021 | Goscha | ................... | G06N 3/08 |
| 2022/0020363 A1* | 1/2022 | Vasquez | ............... | G10L 15/22 |

FOREIGN PATENT DOCUMENTS

| | | |
|---|---|---|
| KR | 1020160115330 | 10/2016 |
| KR | 1020170036805 | 4/2017 |
| KR | 1020190100630 | 8/2019 |

* cited by examiner

DISPLAY DEVICE AND CONTROL METHOD THEREFOR

CROSS-REFERENCE TO RELATED APPLICATIONS

This application is the National Stage filing under 35 U.S.C. 371 of International Application No. PCT/KR2019/011309, filed on Sep. 3, 2019, the contents of which are all incorporated by reference herein in its entirety.

TECHNICAL FIELD

Embodiments relate to a display device and a control method therefor.

BACKGROUND ART

Recently, digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users may actively select the types of watching programs, the watching time, and the like. The IPTV and smart TV services may provide various additional services, such as Internet search, home shopping, and online games, based on such interactivity.

Recently, a TV for searching for content through interworking with a content provider based on voice recognition has been developed.

However, a conventional TV has a problem in that a content provider needs to provide metadata in advance for voice recognition and it is not possible to search for content owned by a content provider that does not provide metadata.

Conventionally, there is a problem in that, when a TV content search method and a content search method of a content provider are different, it is difficult to search for content based on voice recognition.

DISCLOSURE

Technical Problem

Embodiments provide a display device and a control method therefor for easily making a content related request.

Embodiments provide a display device and a control method therefor for making a content related request without an application of a content provider.

Embodiments provide a display device and a control method therefor for enhancing user convenience by enabling content related control.

Embodiments provide a display device and a control method therefor for enhancing user convenience by accessing content in various ways.

Technical Solution

According to an aspect of an embodiment, a display device includes a network interface configured to communicate with at least one content provider (CP), a memory configured to store a CP application of each of the at least one CP, a display configured to display a content image through a first CP application of the at least one CP application, and a controller. When receiving an utterance during display of the content image through the first CP application, the controller may control the network interface to transfer request information corresponding to the utterance to a first CP that provides the first CP application.

According to another aspect of an embodiment, a method of controlling a display device includes displaying a content image through a first content provider (CP) application of at least one CP application, and when receiving an utterance during display of the content image through the first CP application, transferring request information corresponding to the utterance to a first CP that provides the first CP application.

Advantageous Effects

According to an embodiment, when an utterance is received during display of a content image, a request of a user may be immediately transferred to a content provider that provides the corresponding content image to acquire a result corresponding to the request, thereby advantageously enhancing user convenience.

According to an embodiment, even if a display device does not receive metadata from a content provider, the display device may immediately exchange information with a content provider that provides the corresponding content image at any time during display of the corresponding content image. In particular, a remote control device may make a request to a content provider that provides a content image displayed on a screen through an utterance without separate manipulation, thereby advantageously further enhancing user convenience.

According to an embodiment, even if the display device and the content provider use different methods, the display device may advantageously make a request for various pieces of information or transfer a command to the content provider in any degree.

According to an embodiment, even if a content image is not displayed, the display device may advantageously make a request for various pieces of information to the corresponding content provider or transfer a command thereto in real time through an utterance including the content provider that provide a corresponding content image.

According to an embodiment, when a content image is not displayed and the content provider that provides a corresponding content image are not included in the utterance, the display device may advantageously make a request for various pieces of information to a plurality of content providers that are not a specific content provider or transfer a command thereto in real time.

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
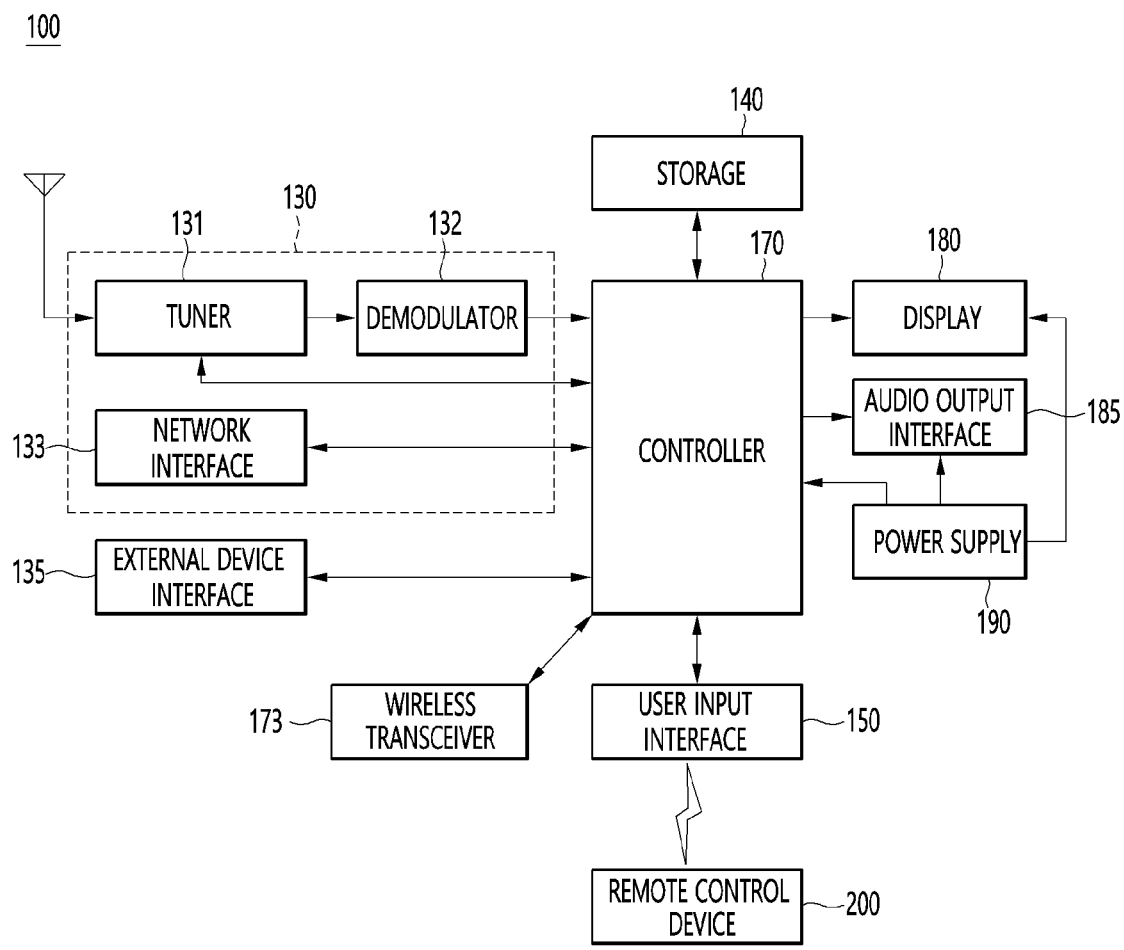
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiver 130, an external device interface 135, a storage 140, a user input interface 150, a controller 170, a wireless transceiver 173, a display 180, an audio output interface 185, and a power supply 190.

The broadcast receiver 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program related data signals and restore the divided video signals, audio signals, and data signals to an output available form.

The network interface 133 may provide an interface for connecting the display device 100 to a wired/wireless network including the Internet network. The network interface 133 may transmit or receive data to or from another user or another electronic device through an accessed network or another network linked to the accessed network.

The network interface 133 may access a predetermined webpage through an accessed network or another network linked to the accessed network. That is, the network interface 133 may transmit or receive data to or from a corresponding server by accessing a predetermined webpage through the network.

The network interface 133 may receive contents or data provided from a content provider or a network operator. That is, the network interface 133 may receive contents such as movies, advertisements, games, VODs, and broadcast signals, which are provided from a content provider or a network provider, through network and information relating thereto.

Additionally, the network interface 133 may receive firmware update information and update files provided from a network operator and transmit data to an Internet or content provider or a network operator.

The network interface 133 may select and receive a desired application among applications open to the air, through network.

The external device interface 135 may receive an application or an application list in an adjacent external device and deliver it to the controller 170 or the storage 140.

The external device interface 135 may provide a connection path between the display device 100 and an external device. The external device interface 135 may receive at least one an image or audio output from an external device that is wirelessly or wiredly connected to the display device 100 and deliver it to the controller 170. The external device interface 135 may include a plurality of external input terminals. The plurality of external input terminals may include an RGB terminal, at least one High Definition Multimedia Interface (HDMI) terminal, and a component terminal.

An image signal of an external device input through the external device interface 135 may be output through the display 180. A sound signal of an external device input through the external device interface 135 may be output through the audio output interface 185.

An external device connectable to the external device interface 135 may be one of a set-top box, a Blu-ray player, a DVD player, a game console, a sound bar, a smartphone, a PC, a USB Memory, and a home theater system, but this is just exemplary.

Additionally, some content data stored in the display device 100 may be transmitted to a user or an electronic device, which is selected from other users or other electronic devices pre-registered in the display device 100.

The storage 140 may store signal-processed image, voice, or data signals stored by a program in order for each signal processing and control in the controller 170.

Additionally, the storage 140 may perform a function for temporarily storing image, voice, or data signals output from the external device interface 135 or the network interface 133 and may store information on a predetermined image through a channel memory function.

The storage 140 may store an application or an application list input from the external device interface 135 or the network interface 133.

The display device 100 may play content files (for example, video files, still image files, music files, document files, application files, and so on) stored in the storage 140 and provide them to a user.

The user input interface 150 may deliver signals input by a user to the controller 170 or deliver signals from the controller 170 to a user. For example, the user input interface 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 may deliver, to the controller 170, control signals input from local keys (not shown) such as a power key, a channel key, a volume key, and a setting key.

Image signals that are image-processed in the controller 170 may be input to the display 180 and displayed as an image corresponding to corresponding image signals. Additionally, image signals that are image-processed in the controller 170 may be input to an external output device through the external device interface 135.

Voice signals processed in the controller 170 may be output to the audio output interface 185. Additionally, voice signals processed in the controller 170 may be input to an external output device through the external device interface 135.

Besides that, the controller 170 may control overall operations in the display device 100.

Additionally, the controller 170 may control the display device 100 by a user command or internal program input through the user input interface 150 and download a desired application or application list into the display device 100 in access to network.

The controller 170 may output channel information selected by a user together with processed image or voice signals through the display 180 or the audio output interface 185.

Additionally, according to an external device image playback command received through the user input interface 150, the controller 170 may output image signals or voice signals of an external device such as a camera or a camcorder, which are input through the external device interface 135, through the display 180 or the audio output interface 185.

Moreover, the controller 170 may control the display 180 to display images and control broadcast images input through the tuner 131, external input images input through the external device interface 135, images input through the network interface, or images stored in the storage 140 to be displayed on the display 180. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless transceiver 173 may perform a wired or wireless communication with an external electronic device. The wireless transceiver 173 may perform short-range communication with an external device. For this, the wireless transceiver 173 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless transceiver 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless transceiver 173 may detect (or recognize) a communicable wearable device around the display device 100. Furthermore, if the detected wearable device is a device authenticated to communicate with the display device 100, the controller 170 may transmit at least part of data processed in the display device 100 to the wearable device through the wireless transceiver 173. Accordingly, a user of the wearable device may use the data processed in the display device 100 through the wearable device.

A voice acquirer 175 may acquire audio. The voice acquirer 175 may include at least one microphone (not shown) and may acquire audio around the display device 100 through the microphone (not shown).

The display 180 may convert image signals, data signals, or on-screen display (OSD) signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing contents input from the image processing device.

In this case, an operating method of a display device according to an embodiment of the present disclosure described below may be performed by one of the display device described with reference to FIG. 1, an image processing device such as the separated set-top box, and a content playback device including the display 180 and the audio output interface 185.

Figure 2:
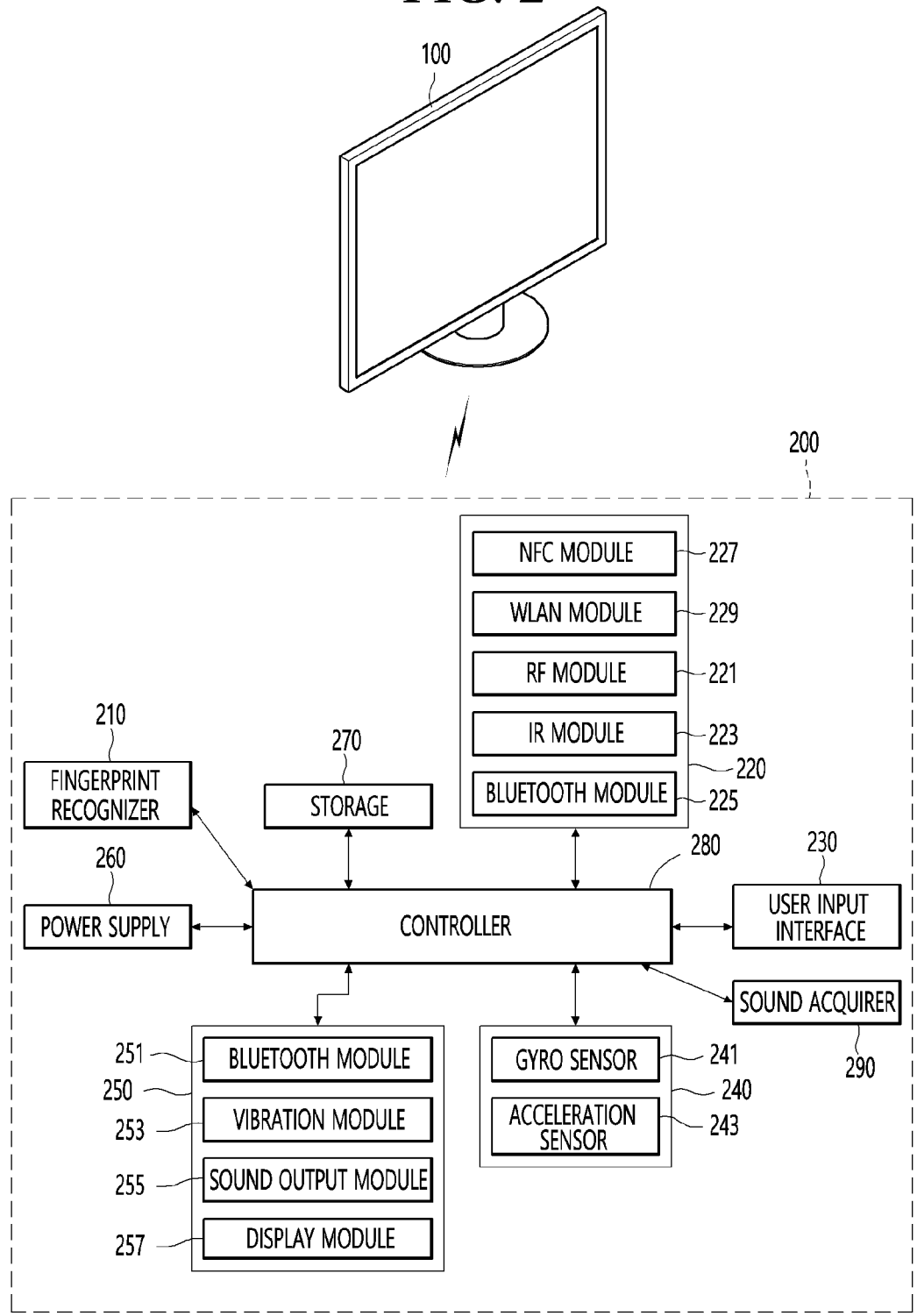
FIG. 2 is a block diagram illustrating a remote control device according to an embodiment of the present disclosure.
Figure 3:
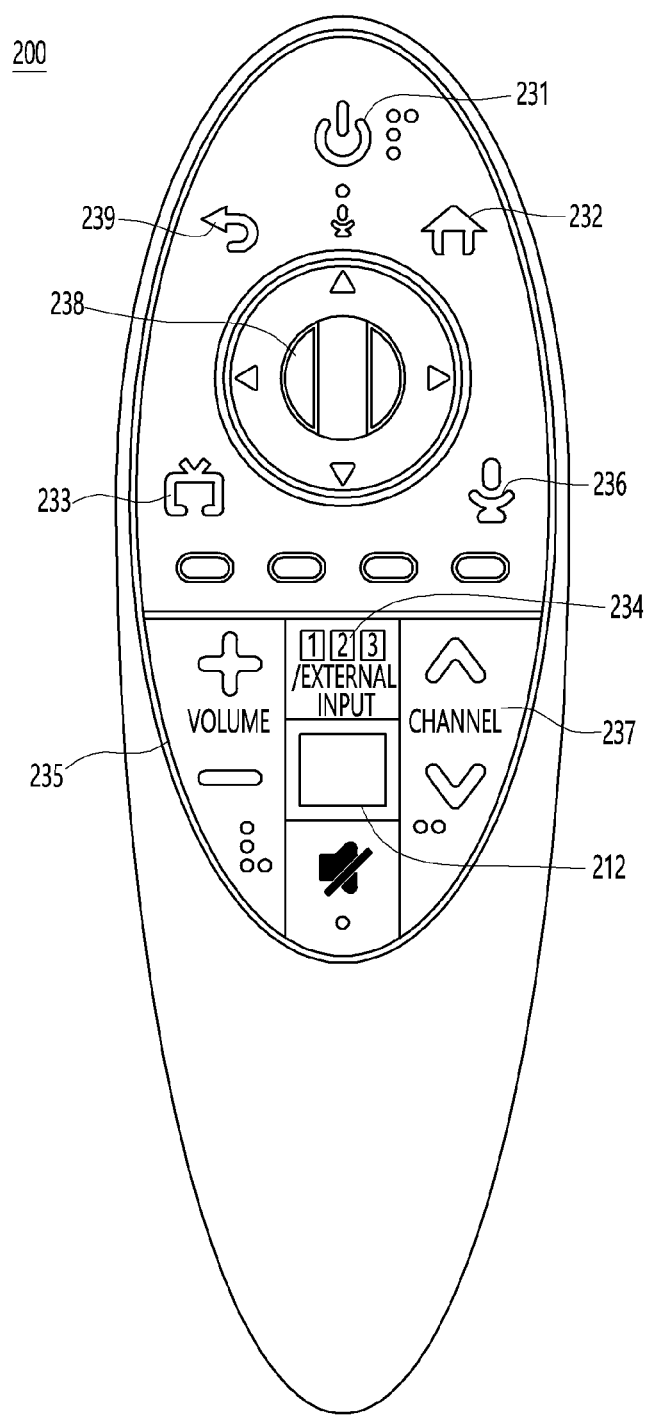
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognizer 210, a wireless transceiver 220, a user input interface 230, a sensor part 240, an output interface 250, a power supply 260, a storage 270, a controller 280, and a sound acquirer 290.

Referring to FIG. 2, the wireless transceiver 220 transmits/receives signals to/from an arbitrary any one of display devices according to the above-mentioned embodiments of the present disclosure.

The remote control device 200 may include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 may transmit signals containing information on a movement of the remote control device 200 to the display device 100 through the wireless transceiver 220.

Moreover, the remote control device 200 may receive signals transmitted from the display device 100 through the RF module 221 and if necessary, may transmit a command on power on/off, channel change, and volume change to the display device 100 through the IR module 223.

The user input interface 230 may be configured with a keypad button, a touch pad, or a touch screen. A user may manipulate the user input interface 230 to input a command relating to the display device 100 to the remote control device 200. If the user input interface 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The voice adjustment button 235 may be a button for adjusting the size of a volume output from the display device 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Again, FIG. 2 is described.

If the user input interface 230 includes a touch screen, a user may touch a soft key of the touch screen to input a command relating to the display device 100 to the remote control device 200. Additionally, the user input interface 230 may include various kinds of input means manipulated by a user, for example, a scroll key and a jog key, and this embodiment does not limit the scope of the present disclosure.

The sensor part 240 may include a gyro sensor 241 or an acceleration sensor 243 and the gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor and sense a distance with respect to the display 180 of the display device 100.

The output interface 250 may output image or voice signals in response to manipulation of the user input interface 230 or image or voice signals corresponding to signals transmitted from the display device 100. A user may recognize whether the user input interface 230 is manipulated or the display device 100 is controlled through the output interface 250.

For example, the output interface 250 may include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless transceiver 220.

Additionally, the power supply 260 supplies power to the remote control device 200 and if the remote control device 200 does not move for a predetermined time, stops the power supply, so that power waste may be reduced. The power supply 260 may resume the power supply if a predetermined key provided at the remote control device 200 is manipulated.

The storage 270 may store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage 270, information on a frequency band for transmitting/receiving signals to/from the display device 100 paired with the remote control device 200 and refer to it.

The controller 280 controls general matters relating to control of the remote control device 200. The controller 280 may transmit a signal corresponding to a predetermined key manipulation of the user input interface 230 or a signal corresponding to movement of the remote control device 200 sensed by the sensor part 240 to the display device 100 through the wireless transceiver 220.

Additionally, the sound acquirer 290 of the remote control device 200 may obtain voice.

The sound acquirer 290 may include at least one microphone and obtain voice through the microphone 291.

Figure 4:
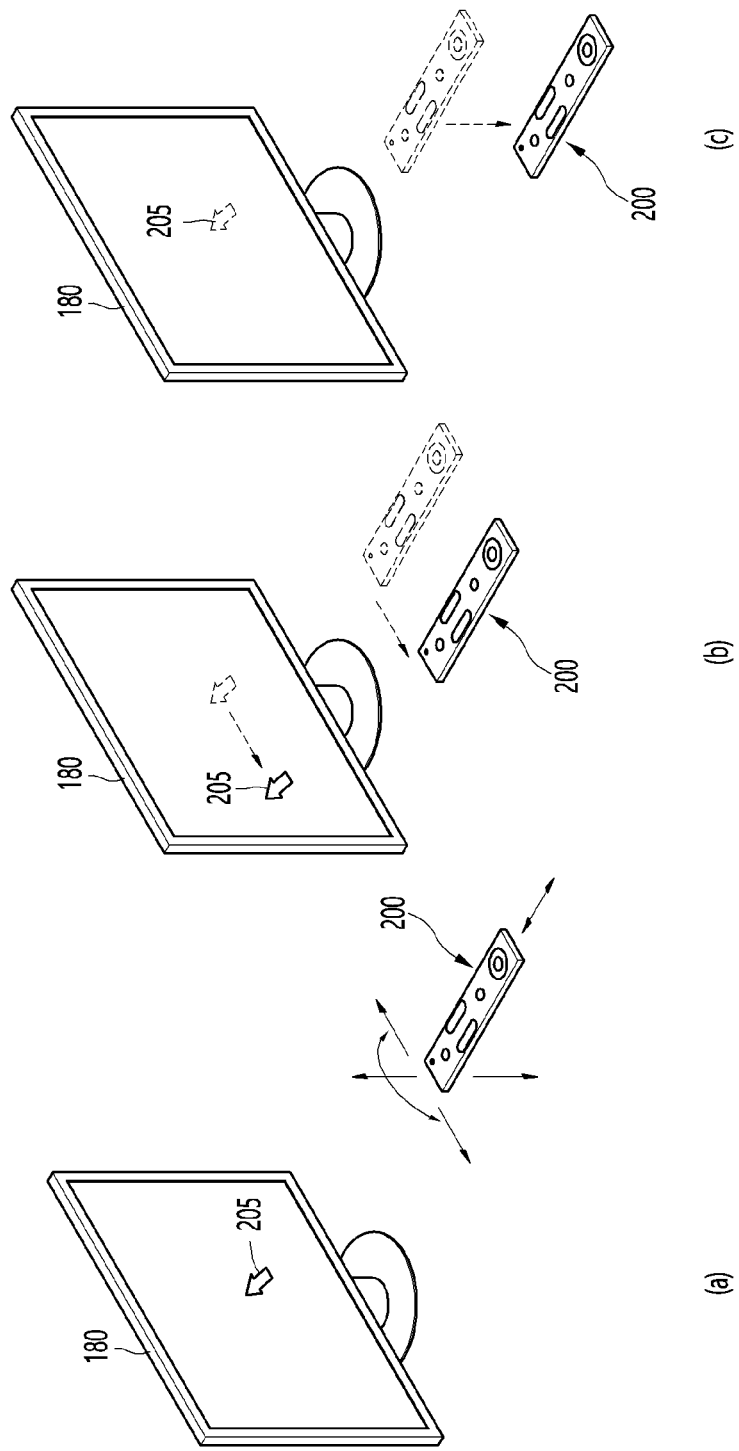
FIG. 4 is a view illustrating an example of utilizing a remote control device according to an embodiment of the present disclosure.

Next, FIG. 4 is described.

FIG. 4 is a view of utilizing a remote control device according to an embodiment of the present disclosure.

FIG. 4(a) illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(b) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(c) illustrates that while a specific button in the remote control device 200 is pressed, a user moves the remote control device 200 away from the display 180. Thus, a selection area in the display 180 corresponding to the pointer 205 may be zoomed in and displayed larger.

On the other hand, if a user moves the remote control device 200 close to the display 180, a selection area in the display 180 corresponding to the pointer 205 may be zoomed out and displayed in a reduced size.

On the other hand, if the remote control device 200 is moved away from the display 180, a selection area may be zoomed out and if the remote control device 200 is moved closer to the display 180, a selection area may be zoomed in.

Additionally, if a specific button in the remote control device 200 is pressed, recognition of a vertical or horizontal movement may be excluded. That is, if the remote control device 200 is moved away from or closer to the display 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
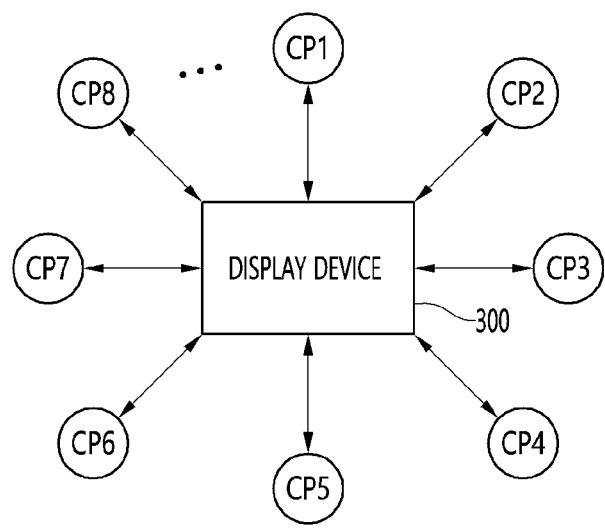
FIG. 5 is a schematic diagram showing a relationship between a display device and a content provider according to an embodiment.

FIG. 5 is a schematic diagram showing a relationship between a display device and a content provider according to an embodiment.

Referring to FIG. 5, a display device 300 may exchange information with a plurality of content providers CP1 to CP8. The display device 300 may be the display device 100 shown in FIG. 1. Thus, components of the display device 300 may be the same as those of the display device 100 shown in FIG. 1 or may have greater or fewer components.

The content providers CP1 to CP8 may collectively refer to providers, devices, machines, hardware, software, etc. for providing information to the display device 300. The content providers CP1 to CP8 may include an application and a server. The application may be referred to as a content provider application and the server may be referred to as a content provider server.

The display device 300 may include a content provider application. That is, the content provider application may be installed or stored in the display device 300.

For example, the display device 300 may display an icon about at least one content provider application on a screen. The display device 300 may perform control to execute the corresponding content provider application in response to selection of a specific icon displayed on the screen. When the content provider application is executed, the display device 300 may display a preset initial image or initial page provided by the content providers CP1 to CP8 on the screen.

In another example, the display device 300 may display a list including at least one content provider application item on the screen. The display device 300 may perform control to execute the corresponding content provider application in response to selection of a specific content provider application item from the list.

For example, the content provider application may be installed in the display device 300 before the display device 300 is commercially available. For example, the content provider application may be installed in the display device 300 in response to a user request after the display device 300 is commercially available.

The content provider server may perform overall management such as content creation, filtering, sorting, storage, maintenance, deletion, update, addition, control, protection, authentication, and communication with peripheral devices.

The content providers CP1 to CP8 may create and distribute a content provider application and may establish and mange a content provider server. In this case, the content provider application may be distributed, installed, and stored in the display device 300, and the content provider server may be separately installed from a third place other than the display device 300. The display device 300 may access the content provider server through a wired/wireless network. Although described later, the display device 300 may include a network interface 310 (refer to FIG. 6) as an interface for accessing the content provider server through a wired/wireless network.

The display device 300 may access the content provider server through the content provider application and may receive information from the content provider server. Thus, the content provider application may connect the display device 300 to a content provider server. For example, when the content provider application is executed and an initial page is displayed, the display device 300 may transfer a request in response to selection of various commands included in the corresponding initial page to the content provider server and may receive response information or execution information in response to the corresponding request from the content provider server. The display device

300 may perform control to perform a corresponding operation according to the received response information or execution information.

According to an embodiment, when receiving a utterance during display of a content image provided by the specific content providers CP1 to CP8, the display device 300 may transfer request information corresponding to the utterance to the content providers CP1 to CP8. Here, content may also be referred to media. The utterance may be a control command related to content search, content play, or a content image. The content search may include "Find an action movie". The content play may include "Play avengers endgame". The control command related to the content image may include "Rewind the movie 30 minutes ago".

The content providers CP1 to CP8 may create execution information in response to request information of the display device 300.

For example, the content providers CP1 to CP8 may search for action movies and may create a searched action movie list as execution information in response to the request information of "Find an action movie" from the display device 300 and may provide the action movie list to the display device 300. The action movie list may be formed in a character or a thumbnail image.

For example, the content providers CP1 to CP8 may search for a corresponding movie in response to the request information of "Play avengers endgame" from the display device 300, and when the corresponding movie is searched, the content providers CP1 to CP8 may provide information about the corresponding movie to the display device 300 as execution information. For example, information on the corresponding movie may be provided to the display device 300 in a real-time streaming form, and the display device 300 may reproduce the corresponding movie in real time. For example, the information about the corresponding movie may be data information about the total size of the corresponding movie, the data information may be provided to the display device 300, and the display device 300 may store the corresponding data information in a memory and may then reproduce the movie or reproduce the movie in real time in a streaming form.

For example, the content providers CP1 to CP8 may check the current time of the corresponding movie in response to the request information of "Rewind the movie 30 minutes ago" from the display device 300, may search for an image from 30 minutes ago from the current time, and may provide information on the image from 30 minutes ago as execution information to the display device 300, and the display device 300 may reproduce the corresponding image from 30 minutes ago based on information on the image from 30 minutes ago. The information on the image from 30 minutes ago may be streaming information about the image from 30 minutes ago.

From the above, according to an embodiment, when receiving an utterance during display of a content image, the display device 300 may immediately transfer a user request to the content providers CP1 to CP8 that provide the corresponding content image to achieve a result corresponding to the request, thereby enhancing user convenience.

According to an embodiment, even if the display device 300 does not receive metadata from the content providers CP1 to CP8, information may be immediately exchanged with the content providers CP1 to CP8 that provide the corresponding content image at any time during display of the corresponding content image. In particular, a remote control device may make a request to the content providers CP1 to CP8 that provide a content image displayed on a screen through an utterance without separate manipulation, thereby further enhancing user convenience.

Even if the display device 300 and the content providers CP1 to CP8 use different methods, the display device 300 may make a request for various pieces of information or may transfer a command to the content providers CP1 to CP8 in any degree.

According to an embodiment, even if a content image is not displayed, the display device 300 may make a request for various pieces of information to the corresponding content providers CP1 to CP8 or may transfer a command thereto in real time through an utterance including the content providers CP1 to CP8 that provide a corresponding content image.

According to an embodiment, when a content image is not displayed and the content providers CP1 to CP8 that provide a corresponding content image are not included in the utterance, the display device 300 may make a request for various pieces of information to the plurality of content providers CP1 to CP8 that are not a specific content provider or may transfer a command thereto in real time. The plurality of content providers CP1 to CP8 may be a content provider that installs a content provider application installed in the display device 300, but the embodiments are not limited thereto.

Figure 6:
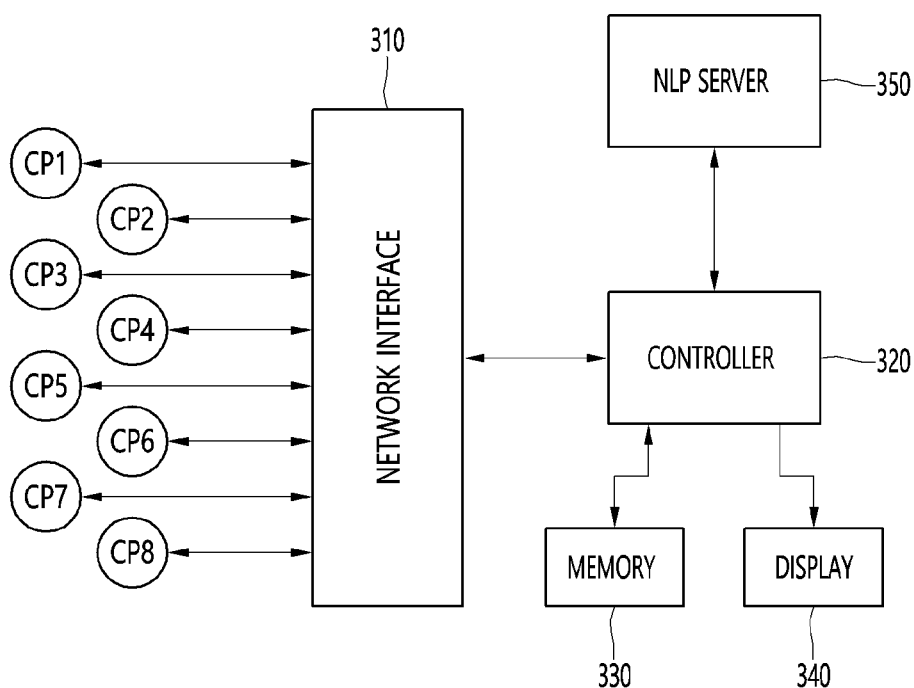
FIG. 6 is a block diagram showing a display device according to an embodiment.

FIG. 6 is a block diagram showing a display device according to an embodiment.

Referring to FIG. 6, the display device 300 according to an embodiment may include a network interface 310, a controller 320, a memory 330, a display 340, and a Natural Language Processing (NLP) server 350. The display device 300 may further include a proxy server 360 (refer to FIG. 8). The network interface 310 may be the network interface 133 shown in FIG. 1. The controller 320 may be the controller 170 shown in FIG. 1. The memory 330 may be the storage 140 shown in FIG. 1. The display 340 may be the display 180 shown in FIG. 1.

The network interface 310 may provide an interface for connecting the display device 300 to a wired/wireless network including the Internet. The network interface 310 may transmit or receive data to or from another user or another electronic device through a connected network or another network linked to the connected network. The network interface 310 may access a predetermined web page through a connected network or another network linked to the connected network. That is, the network interface 310 may access a predetermined web page through a network and may transmit or receive data to and from a corresponding server.

The memory 330 may store various pieces of information related to the display device 300. The memory 330 may store various pieces of image information displayed or reproduced by the display device 300. The memory 330 may store various pieces of information related to a viewer, which are acquired using the display device 300.

In particular, the memory 330 may store the content provider application provided by the content providers CP1 to CP8. The content provider application may also be referred to as a content provider. The content provider application may connect the display device 300 to the content provider server and may enable information exchange between the display device 300 and the content provider server. For example, when the content provider application is executed, the display device 300 and the content providers CP1 to CP8 may be connected to be ready to exchange information therebetween. In this case, the display device 300 may transfer request information to the corresponding content provider server through the executed content provider application and may receive execution information in response to the request information.

The display 340 may display various pieces of data or information. For example, the display 340 may display various broadcast images received through airwaves, cables, satellites, IPTVs, etc. For example, when the content provider application is executed, the display 340 may display an initial page set by the content providers CP1 to CP8. The initial page may be partially or completely changed, updated, or deleted by the content providers CP1 to CP8. For example, the display 340 may display various content images received from the content providers CP1 to CP8 through the content provider application.

The NLP server 350 may recognize, analyze, and/or process an utterance of a user. The NLP server 350 may generate a natural language corresponding to the utterance. The NLP server 350 may acquire a keyword and/or intent based on the natural language. The NLP server 350 may or may not be included in the display device 300. When the NLP server 350 is not included in the display device 300, the display device 300 and the NLP server 350 may communicate with each other through the network interface 310 to exchange information therebetween.

The NLP server 350 may generate or acquire request information to be transferred to the content providers CP1 to CP8.

For example, the request information may be Speech-To-Text (STT)-based character data about the utterance. The STT may be a method for converting voice into a character. The STT may use a voice recognition method. For example, the NLP server 350 may sample an input voice signal to convert the voice signal into a digital signal, may remove noise from the digital signal, and may then extract a useful and meaningful feature. For example, the NLP server 350 may compare the extracted feature vector with a pre-acquired vocabulary pattern of a dictionary to find word characters most similar to the extracted feature. For example, the NLP server 350 may combine the found word characters to generate a sentence text corresponding to the utterance as character data. Thus, the controller 320 may transfer the character data corresponding to the utterance to the content provider server using the voice recognition method.

For example, the request information may include keyword information and intent information about an utterance. As described above, the NLP server 350 may generate the keyword information and the intent information based on the word characters found via comparison between the extracted feature vector and the vocabulary pattern of the dictionary. For example, when "Find an action movie" is uttered, the NLP server 350 may generate "action movie" as the keyword information and may generate "Find" as the intent information. Thus, control information may transfer the keyword information corresponding to "action movie" and intent information corresponding to "Find" to the content providers CP1 to CP8.

Although not shown, the display device 300 may further include a content provider server. The content provider server may be established by a manufacturer of the display device 300 but the embodiments are not limited thereto. The display device 300 may receive various content images through access with the content provider server and may display the content images on the display 340. The content provider server may or may not be included in the display device 300. When the content provider server is not included in the display device 300, the display device 300 and the content provider server may communicate with each other through the network interface 310 to enable information exchange between the display device 300 and the content provider server. The display device 300 may receive a content image through the content provider server or may receive a content image through the content provider application.

The controller 320 may manage the display device 300 as a whole. The controller 320 may perform control to display a broadcast image, a content image, or the like. The controller 320 may control the network interface 310 to exchange information with another user or an electronic device through a network. The controller 320 may perform control to operate in response to an input command or signal.

In particular, the controller 320 may perform control to execute a request or command related to content through communication or connection with the content providers CP1 to CP8.

For example, when receiving an utterance during display of a content image through the content provider application, the controller 320 may perform control to immediately transfer a request of a user to the content providers CP1 to CP8 that provide the corresponding content image.

For example, even if the controller 320 does not receive metadata from the content providers CP1 to CP8, information may be immediately exchanged with the content providers CP1 to CP8 that provide the corresponding content image at any time during display of the corresponding content image.

For example, even if the display device 300 and the content providers CP1 to CP8 use different methods, the controller 320 may make a request for various pieces of information or may transfer a command to the content providers CP1 to CP8 in any degree.

For example, even if a content image is not displayed, the controller 320 may make a request for various pieces of information or may transfer a command to the corresponding content providers CP1 to CP8 through an utterance including the content providers CP1 to CP8 that provide the corresponding content image.

For example, when a content image is not displayed and the content providers CP1 to CP8 that provide a corresponding content image are not included in the utterance, the controller 320 may make a request for various pieces of information to the plurality of content providers CP1 to CP8 that are not a specific content provider or may transfer a command thereto in real time.

For example, the controller 320 may transfer request information to the content providers CP1 to CP8, may receive execution information in response to the request information from the content providers CP1 to CP8, and may perform control to operate according to the execution information.

The controller 320 may receive different pieces of execution information according to the request information. For example, when the request information is content search, the controller 320 may receive a content list searched from the content provider server. For example, when the request information is content play, the controller 320 may receive content related to a request included in the request information in a streaming form from the content provider server. For example, when the request information is a control command related to content, the controller 320 may receive a play result of corresponding content controlled according to the control command from the content provider server.

In order to share content related information or a content-related control command between the display device 300 and the content providers CP1 to CP8, setting may be previously achieved for the sharing.

As shown in Table 1 below, parameters of content related information or the content-related control command may be provided.

TABLE 1

|  |  |  | Foreground | | Background | |
|---|---|---|---|---|---|---|
|  |  |  | CP 1 | CP 2 | CP 1 | CP 2 |
| Content Search/ Play | InAppSearch | "Search XXX on XXX" | O | O | O | O |
|  | InAppPlay | "Play XXX on XXX" | O | O | O | O |
|  | SearchContent | "Search Stranger Things" | O | O | O | X |
|  | PlayContent | "Play Stranger Things" | O | O | O | X |
| Content control | PlayListControl | "Play next content" | O | X | X | X |
|  | SkipIntro | "Skip intro" | O | X | X | X |
|  | MediaFoward | "Forward at 30 seconds" | O | X | X | X |
|  | MediaBackward | "Backward at 30 seconds" | O | X | X | X |
|  | MediaMove | "Start over" | O | X | X |  |
|  | Play/Pause/Stop | IR key operation | O | O | N/A | N/A |
|  | Previous/Next |  | O | O | N/A | N/A |
|  | Rewind/ FastForward |  | O | O | N/A | N/A |
|  | GoBack |  | O | O | N/A | N/A |

In Table 1, "O" may mean that a corresponding parameter in a foreground and/or a background is capable of being used between the display device 300 and the content providers CP1 to CP8. "X" may mean that a corresponding parameter in a foreground and/or a background is capable of being used between the display device 300 and the content providers CP1 to CP8. "N/A" may mean that a protocol is not configured between the display device 300 and the content providers CP1 to CP8 in order to transfer a corresponding parameter in a foreground and/or a background. In the case of "N/A", when a protocol is configured between the display device 300 and the content providers CP1 to CP8, a corresponding parameter may be used. Referring to Wikipedia, the foreground and the background may each be a scheduling algorithm used to control execution of multiple processes in a single processor. That is, from two waiting lists, a first list may be referred to as the foreground and a second list may be referred to as the background.

When a concept of the foreground and the background is applied to the display device 300, the foreground may be the state in which a content image is currently displayed on the display 340, and the background may be the state in which a content image is executed or reproduced but is on standby to be displayed on the display 340.

As seen from Table 1 above, a corresponding parameter may or may not be transferred according to the content providers CP1 to CP8 and/or a foreground and/or a background.

For example, it may be possible to use a parameter related to content search or execution irrespective of a foreground and/or a background, but it may not be possible to use a parameter related to content control when a content image is operated in a background, which is merely an example. For example, a parameter related to content control may also be used even if a content image is operated in a background.

In a content search/play function, "InAppSearch" may be a parameter used to search for content from specific content providers CP1 to CP8. In the content search/play function, "InAppPlay" may be a parameter used to play content in the specific content providers CP1 to CP8. In the content search/play function, "SearchContent" may be a parameter used to search for content from the unspecified content providers CP1 to CP8. In the content search/play function, "PlayContet" may be a parameter used to play content in the specific content providers CP1 to CP8.

In content control, "PlayListControl" may be a parameter for reproducing a next content image. In the content control, "SkipIntro" may be a parameter for skipping a specific part of a content image. In the content control, "MediaForward" may be a parameter for movement from the current point of a content image to a predetermined time before. In the content control, "MediaBckward" may be a parameter for movement from the current point of the content image to a predetermined time after. In the content control, "MediaMove" may be a parameter for movement from the current content image to a specific content image.

A parameter related to a key operation of a remote control device, that is, "Play/Pause/Stop", "Previous/Next", "Rewind/FastForward", and "GoBack" may also be included in request information corresponding to a corresponding utterance using the utterance of a user and may be transferred to the content providers CP1 to CP8.

Hereinafter, a content search/play/control method using the aforementioned parameter will be described.

Figure 7:
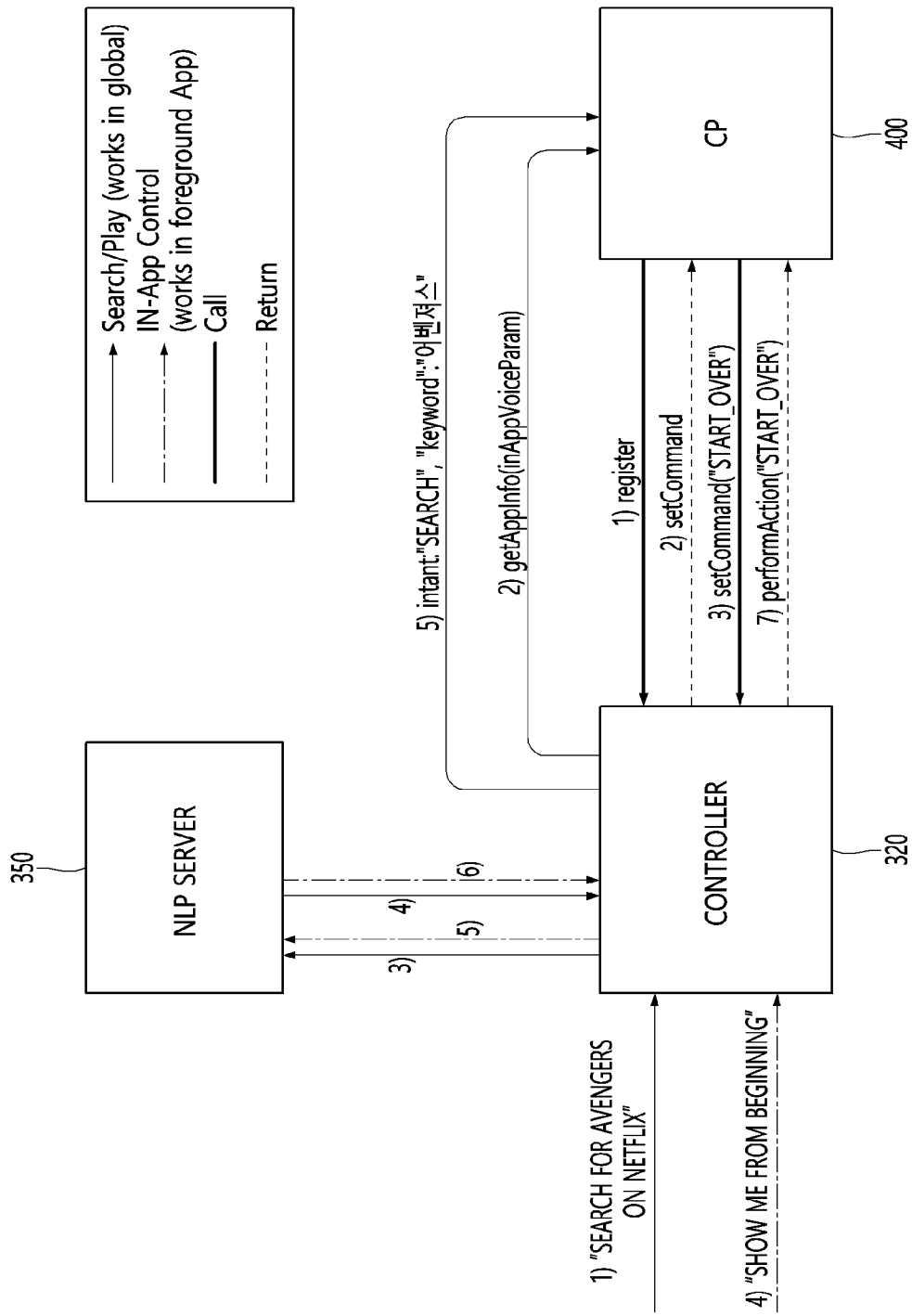
FIG. 7 shows information flow between a display device and a content provider according to an embodiment.

FIG. 7 shows information flow between a display device and a content provider according to an embodiment. FIG. 7 is a diagram containing content search and content control.

As shown in FIG. 7, data or information may be exchanged between the display device 300 and a content provider 400 using a data format. The content provider 400 may be one of the plurality of content providers CP1 to CP8 shown in FIGS. 5 and 6.

With regard to content search, when receiving an utterance of "Search for Avengers on Netflix" (1), the controller 320 may transmit the corresponding utterance to the NLP server 350 (3). Before transferring the corresponding utterance to the NLP server 350, the controller 320 may perform a pre-stop operation on content search using the content provider 400 and the utterance based on the parameter of "getAppinfo". That is, the controller 320 may include "InAppVoiceParam" in the parameter of "getAppinfo" and may transfer the same to the content provider 400 (2). The content provider 400 may be ready to respond to content search using the controller 320 and the utterance based on "InAppVoiceParam" included in the parameter received from the controller 320.

The NLP server 350 may analyze the corresponding utterance to acquire words corresponding to the corresponding utterance and may acquire keyword information and intent information based on the acquired words. The NLP server 350 may provide the acquired keyword information and intent information to the controller 320 (4). For example, the keyword information may be "Netflix" and "Avengers" and the intent information may be "Search".

The controller 320 may include the keyword information and intent information received from the NLP server 350 in the parameter and may transfer the same to the content provider 400 (5). For example, "SEARCH" as "intent" and "Avengers" as"keyword" may be included in the parameter.

The content provider 400 may extract keyword information and intent information from the parameter received from the controller 320 and may search for corresponding content from the keyword information and the intent information. When the corresponding content is searched, the controller 320 may receive the content search result from the content provider 400. The controller 320 may control the display 340 to display the received content search result thereon through the content provider application.

With regard to content control, when receiving an utterance of "Show me from beginning" (4), the controller 320 may transfer the corresponding utterance to the NLP server 350 (5). Before transferring the corresponding utterance to the NLP server 350, the controller 320 may perform a pre-stop operation for content control with the content provider 400. For example, the controller 320 may receive register information from the content provider 400 (1), may register the corresponding content provider 400, and may transfer information on registration completed to the content provider 400 using the parameter of "setCommand" (2). In this case, the corresponding content provider 400 may also include request information for requesting information on a command for content control in the parameter.

Then, the controller 320 may receive information on the content control command from the content provider 400 using the parameter of "setCommand" (3). For example, when the parameter is "setCommand("START_OVER")", the controller 320 may register "START_OVER" included in the parameter in the memory 330 and may refer to a content control command request to be requested to the content provider 400 in the future. For example, only one piece of control command information (START_OVER) may be included in the parameter, but all pieces of control command information for content control by the content provider 400 may be included in the parameter. The controller 320 may recognize control command information for content control by the content provider 400 through the parameter received from the content provider 400.

The NLP server 350 may analyze the corresponding utterance to acquire keyword information and intent information. The NLP server 350 may provide the acquired keyword information and intent information to the controller 320 (6). For example, the keyword information may be "Beginning" and the intent information may be "Show".

The controller 320 may include the keyword information and the intent information received from the NLP server 350 in the parameter and may transfer the same to the content provider 400 (7).

In another example, the controller 320 may acquire control command information registered in the memory 330 based on the keyword information and intent information received from the NLP server 350, and may include the acquired control command information in the parameter and may transfer the same to the content provider 400. For example, when the keyword information received from the NLP server 350 is "Beginning" and the intent information is "Show", the controller 320 may acquire "START_OVER" as one of the control command information of the content provider 400 from the memory 330 based on the keyword information and the intent information, and may include the acquired "START_OVER" in the parameter and may transfer the same to the content provider 400 (7).

Figure 8:
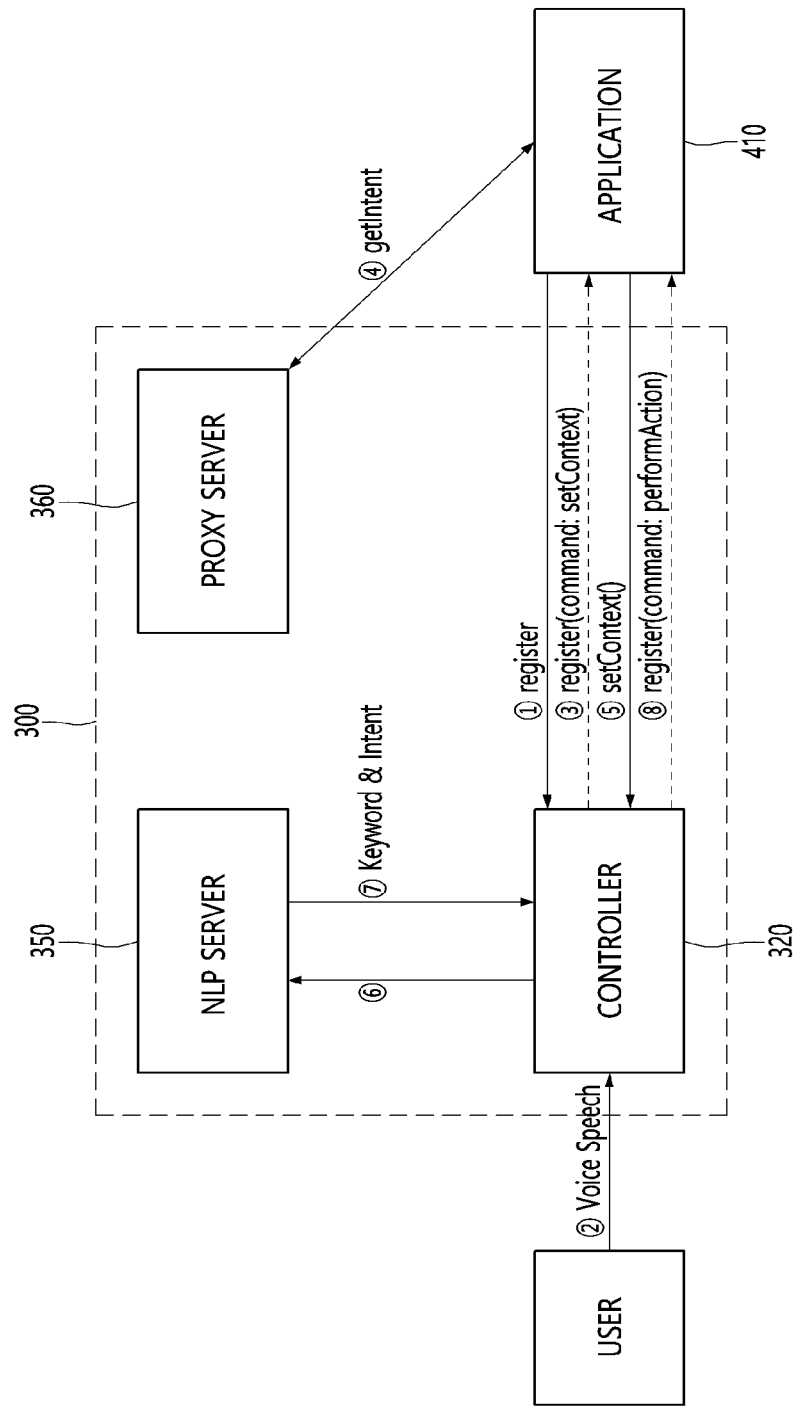
FIG. 8 is a first example diagram showing the state in which a content image operated in a foreground is controlled.
Figure 9:
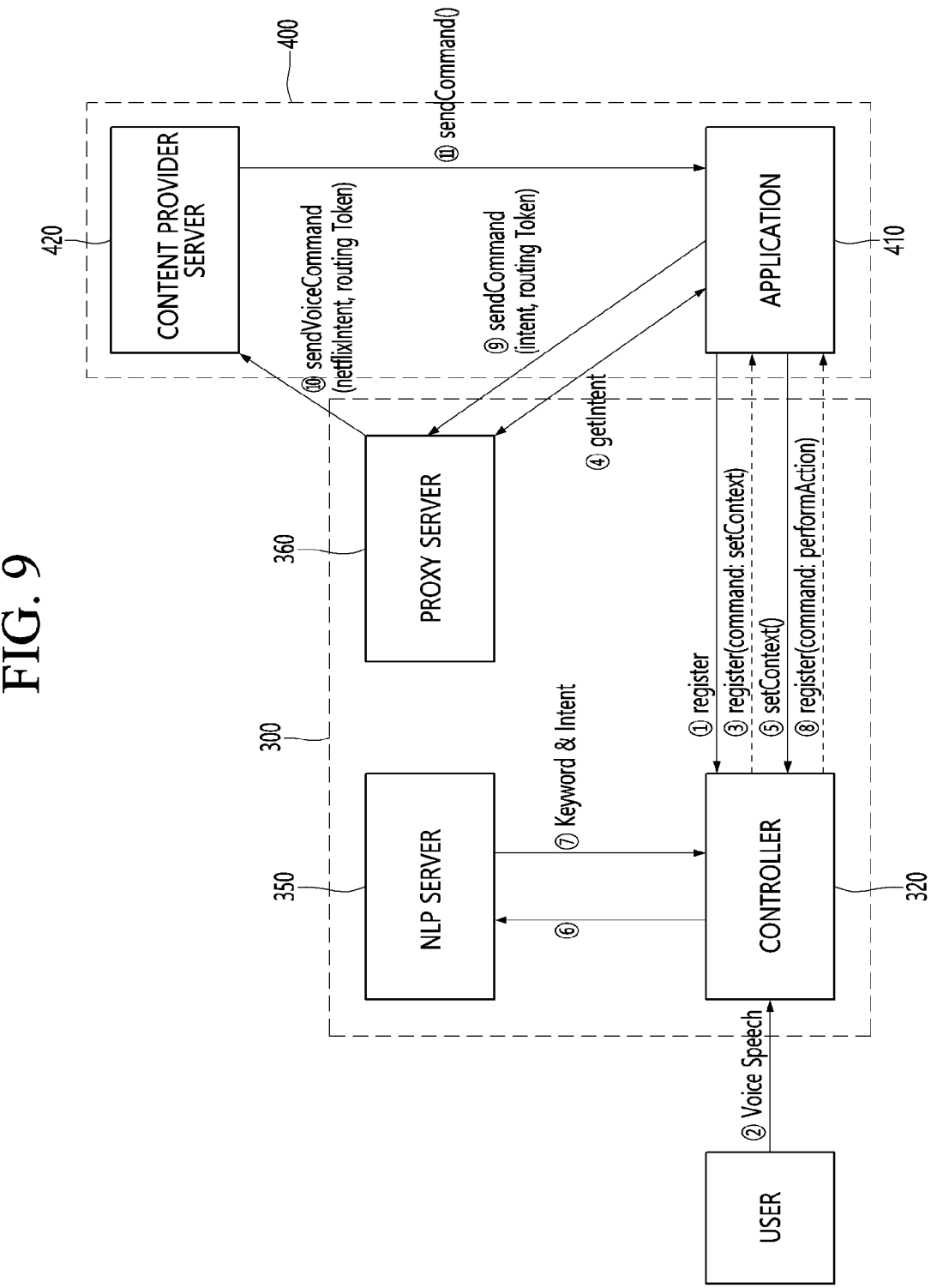
FIG. 9 is a second example diagram showing the state in which a content image is operated in a foreground is controlled.
Figure 10:
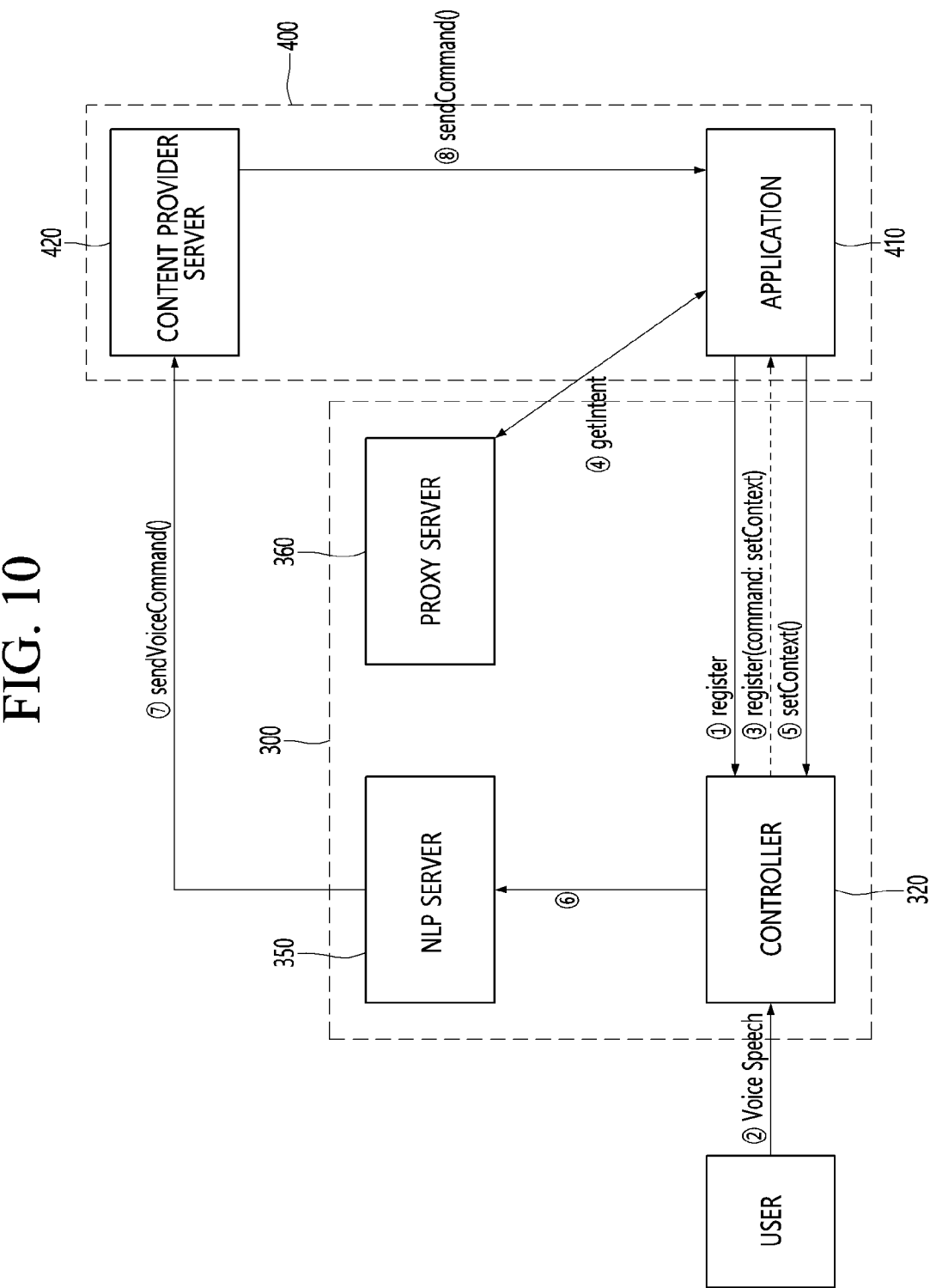
FIG. 10 is a third example diagram showing the state in which a content image operated in a foreground is controlled.
Figure 11:
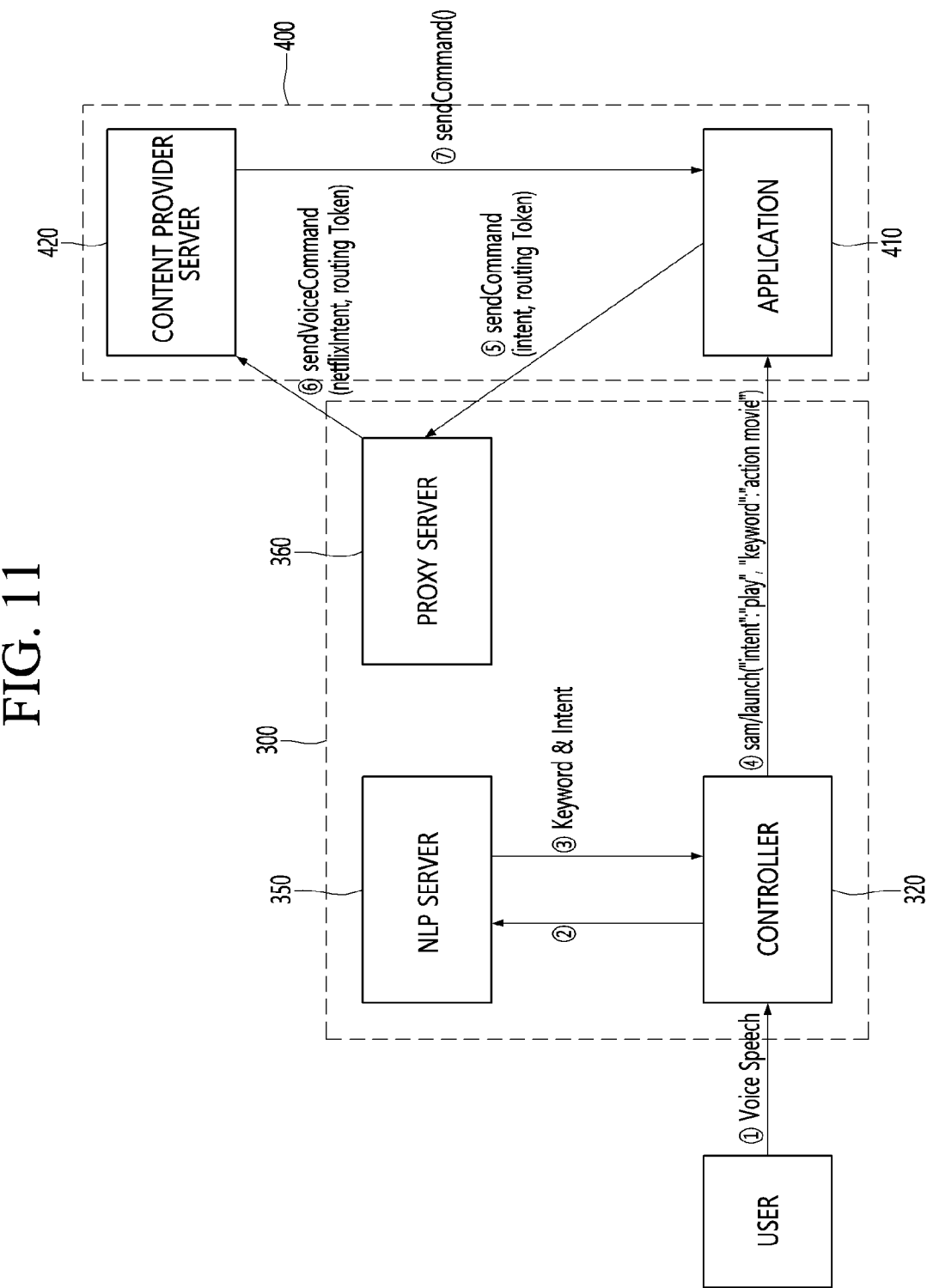
FIG. 11 is a diagram for explaining content search in a content image that is not operated in a foreground or other images operated in a foreground.

FIGS. 8 to 10 relate to control of a corresponding content image when a content image is operated in a foreground and is currently displayed on the display 340, and FIG. 11 relates to content search in a content image that is not operated in a foreground or other images operated in a foreground. Although content play is not shown in the drawings, an operation of content play may be performed in a similar manner to FIG. 11.

First Method of Content Control

FIG. 8 is a first example diagram showing the state in which a content image operated in a foreground is controlled.

Referring to FIG. 8, the controller 320 may receive register information from a content provider application 410 ((1)) and may register the corresponding register information.

When receiving an utterance from a user ((2)), the controller 320 may transfer request information (register(command: setContext)) for requesting a controllable command to be provided by the content provider 400, to the content provider application 410 ((3)). The content provider application 410 may acquire control command information to be transmitted to the controller 320 through the proxy server 360 according to the corresponding request information.

The proxy server 360 may be included in the display device 300, may relay data as well as manage and/or control access of the content provider 400 between the display device 300 and the content provider 400, and may also store an Internet address that is repeatedly requested, and when receiving a corresponding request, the proxy server 360 may find the address and connect or access the content provider 400 having the address. The proxy server 360 may have a cache function, and thus may reduce traffic of a network and may enhance a transmission time of data. The proxy server 360 may have a firewall function, and thus may block a harmful site, may strengthen security, or may prevent external attack such as a hacker. Here, a function of the proxy server 360, which is not stated, may be easily understood from a known art.

For example, the content provider application 410 may transfer a controllable command (getIntent) to be controlled by the content provider 400 to the proxy server 360 ((4)) and may receive a controllable command to be controlled by the content provider 400 and to be used by the display device 300, from the proxy server 360. For example, the content provider application 410 may transfer the controllable command to the proxy server 360, and the proxy server 360 may check whether the controllable command received from the content provider application 410 is to be used in the display device 300 and may the controllable command to be used in the display device 300 to the content provider application 410. The content provider application 410 may generate control command information based on the controllable command received from the proxy server 360. The control command information may be a list including at least one control command but the embodiments are not limited thereto.

The controller 320 may receive control command information(setContext( )) from the content provider application 410 ((5)) and may register the corresponding control command information in the memory 330.

Procedures (6) and (7) may be the same as procedures 5) and 6) shown in FIG. 7, and thus a detailed description thereof will be omitted.

The controller 320 may acquire a control command corresponding to keyword information and intent information from the control command information registered in the memory 330 based on the keyword information and the intent information received from the NLP server 350. The controller 320 may include the acquired control command in a parameter(register(command: performAction)) and may transfer the same to the content provider application 410 ((8)), and the content provider application 410 may control content according to the received control command. The controller 320 may receive the control result from the content provider application 410. For example, the control result may be content controlled by the content provider application 410 but the embodiments are not limited thereto.

Second Method of Content Control

FIG. 9 is a second example diagram showing the state in which a content image is operated in a foreground is controlled.

In the first method of content control, the content provider application 410 is in charge of control of corresponding content, but in the second method of content control, a content provider server 420 may be in charge of control of corresponding content.

Procedures ① to ⑧ in FIG. 9 are the same as procedures ① to ⑧ shown in FIG. 8, and thus a detailed description thereof will be omitted.

The second method of content control content (FIG. 9) may further include procedures ⑨ to ⑪ compared with the first method of content control (FIG. 8).

The content provider application 410 may transfer the control command received from the controller 320 through the proxy server 360 (⑨ sendCommand(intent, routingToken)) to the content provider server 420 (⑩ sendVoiceCommand (netflixIntent, routingToken)). The content provider server 420 may control content according to the received control command and may transfer the control result to the content provider application 410 (⑪ sendCommand( )). Although not shown, the controller 320 may receive the control result from the content provider application 410.

In the first method of content control, control request information and a control result corresponding thereto may be transmitted and received between the controller 320 of the display device 300 and the content provider application 410 of the content provider 400. In the second method of content control, control request information and a control result corresponding thereto may be transmitted and received between the controller 320 of the display device 300 and the content provider server 420 of the content provider 400.

As such, the first method of content control has a simple processing procedure compared with the second method of content control, and thus a processing burden may be reduced and a processing speed may be increased.

Third Method of Content Control

FIG. 10 is a third example diagram showing the state in which a content image operated in a foreground is controlled.

In the first method of content control and the second method of content control, the controller 320 transfers a control command to the content provider 400, but in the third method of content control, the NLP server 350 may directly transfer a control request to the content provider server 420. Thus, in the first method of content control and the second method of content control, the controller 320 may refer to the control command information stored in the memory 330 to acquire a control command to be transferred to the content provider 400, but in the third method of content control, the controller 320 may generate the control request information based on the keyword information and intent information acquired from the NLP server 350 and may transfer the generated control request information to the content provider server 420 of the content provider 400.

Procedures ① to ⑥ in FIG. 10 may be the same as procedures ① to ⑥ shown in FIGS. 8 and 9, and thus a detailed description thereof will be omitted.

The NLP server 350 may analyze a corresponding utterance to acquire keyword information and intent information.

The NLP server 350 may generate control request information based on the keyword information and the intent information. For example, when the keyword information is "Beginning" and the intent information is "Show", the NLP server 350 may generate control request information corresponding to "Beginning" and "Show" based thereon.

The NLP server 350 may include the control request information in the parameter(sendVoiceCommand( )) and may transfer the same to the content provider server 420 (⑦). In this case, the NLP server may receive address information of the content provider server 420 of the content provider 400 through the controller in advance and may set a communication protocol about connection with the content provider server 420 based on the address information.

The content provider server 420 may control corresponding content according to the received control request information and may transfer the control result to the content provider application 410 (⑧sendCommand( )). Although not shown, the controller 320 may receive the control result from the content provider application 410. A procedure in ⑧ FIG. 10 may be the same as a procedure ⑪ in FIG. 9.

In the third method of content control, the control request information may not be transferred to the content provider server 420 through the controller 320 and the content provider application 410, and instead, the NLP server 350 may directly transfer control request information to the content provider server 420, and thus the number of processing procedures may be reduced, a processing burden may be reduced, and a processing speed may be increased.

FIG. 11 is a diagram for explaining content search in a content image that is not operated in a foreground or other images operated in a foreground.

The content image that is not operated in a foreground may be a content image operated in a background, but the embodiments are not limited thereto. Other images operated in a foreground may be various broadcast images or data images received through airwaves, cable, satellite, IPTV, or the like.

When content search is performed, the procedure ① of registering information in content control in FIGS. 8 to 10 may not require procedures ③, ④, and ⑤ of checking information on a command for providing content of the content provider 400, and thus the procedures ③, ④, and ⑤ may be omitted.

Referring to FIG. 11, when receiving an utterance (①), the controller 320 may transfer the corresponding utterance to the NLP server 350 (②) and may receive keyword information and intent information acquired from the corresponding utterance, from the NLP server 350 (③).

The controller 320 may acquire information on whether the corresponding utterance is a search request for content in a content image that is not operated in a foreground or other images operated in a foreground and may transfer request information(sam/launch("intent":"play","keyword":"action movie")) including keyword information and intent information to the content provider application 410 of the corresponding content provider 400 (④). Although the corresponding content provider 400 is exemplified as Netflix, other content providers may also be exemplified.

The content provider application 410 may make a request for content search(sendCommand(intent, routingToken)) to the proxy server 360 (⑤), and the proxy server 360 may make a request for content search(sendVoiceCommand (net-flixIntent, routingToken) to the content provider server 420 (⑥)).

The content provider server 420 may perform content search according to corresponding content search and may transfer the content search result(sendCommand) to the content provider application 410 (⑦). The controller 320 may receive the content search result from the content provider application 410 and may control the display 340 to display, for example, the content search result. When the number of content search results is one, the controller 320 may perform control to reproduce a corresponding content image included in the content search result rather than being displayed on the display 340.

Thus far, with reference to FIGS. 7 to 11, flow of a command, information, and a request for searching for content or controlling content between the display device 300 and the content provider 400 has been described.

Hereinafter, with reference to FIGS. 12 to 19, a control method of the display device 300 such as content search, content play, and content control according to a command, information, and a request will be described in detail.

Figure 12:
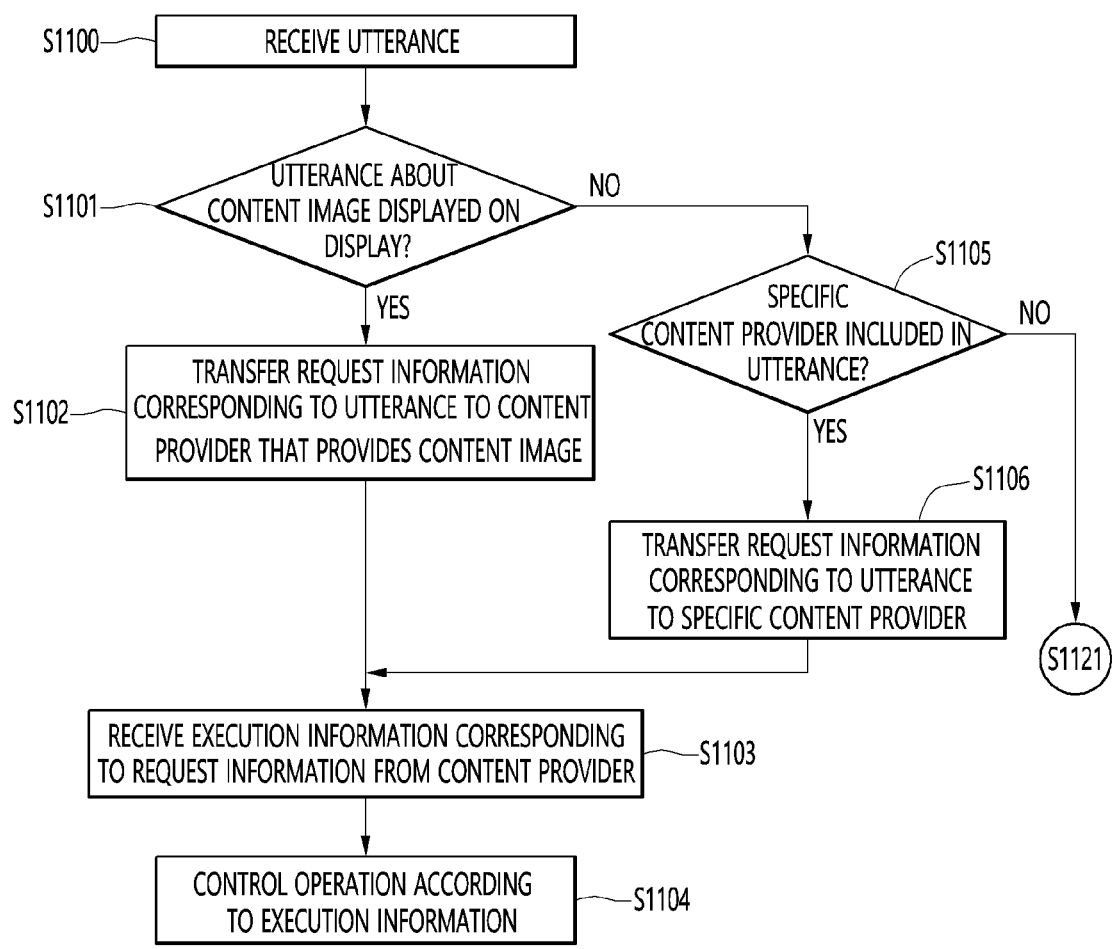
FIG. 12 is a flowchart for explaining a first control method of a display device according to an embodiment.

FIG. 12 is a flowchart for explaining a first control method of a display device according to an embodiment.

Referring to FIGS. 6 and 12, when receiving an utterance (S1100), the controller 320 may acquire information on whether the corresponding utterance is an utterance about an content image displayed on the display 340 (S1101).

When the corresponding utterance is the utterance about the content image displayed on the display 340, the controller 320 may transfer request information corresponding to the utterance to the content provider 400 that provides the corresponding content image (S1102). Here, the content provider 400 may be the content provider shown in FIGS. 7 to 11 and may be one of the plurality of content providers CP1 to CP8 shown in FIG. 6.

Figure 14:
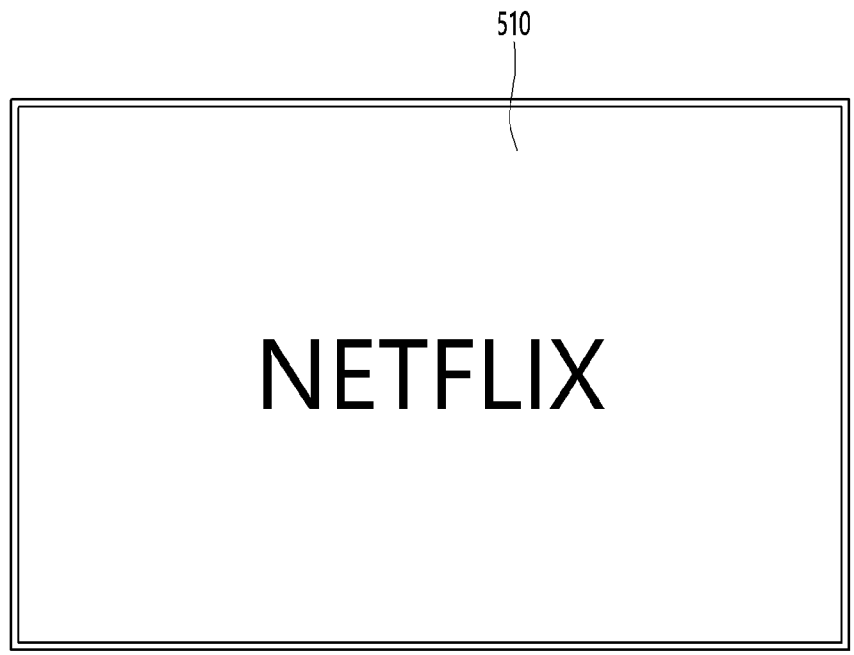
FIG. 14 is a diagram showing the state in which a content image is displayed through a content provider application on a display.

The controller 320 may acquire an image displayed on the display 340. For example, as shown in FIG. 14, an initial page may be displayed on the display 340 through a Netflix application or a specific content image 510 may be reproduced based on the initial page.

When the image displayed on the display 340 is a content image, the controller 320 may recognize that the content image is displayed on the display 340. When the content image is not displayed on the display 340, the controller 320 may recognize that the content image is not displayed on the display 340. As a situation in which the content image is not displayed on the display 340, various broadcast images received through airwaves, cables, satellites, IPTV, or the like may be displayed.

When the content image is displayed on the display 340, the controller 320 may recognize that the corresponding utterance is an utterance for the content image displayed on the display 340 and may transfer request information corresponding to the utterance to the content provider 400 that provides the corresponding content image. For example, it may be assumed that the content image is reproduced through the content provider application 410 provided by the content provider 400. The content provider application 410 may be operated in a foreground. The request information may be acquired by analyzing the corresponding utterance by the NLP server 350. That is, the NLP server 350 may analyze the corresponding utterance to acquire a word text and may acquire keyword information and intent information based on the acquired word text. In this case, the controller 320 may acquire request information corresponding to the utterance based on the keyword information and the intent information and may transfer the acquired request information to the corresponding content provider 400. In another example, the request information may be Speech-To-Text (STT)-based character data about the utterance. In this case, the NLP server 350 may transfer the STT-based character data formed by combining word texts acquired by analyzing the utterance to the controller 320, and the controller 320 may transfer the STT-based character data as request information to the corresponding content provider 400. The content provider 400 may acquire the corresponding character data to acquire keyword information and intent information and may perform content search or content control based on the keyword information and the intent information.

The controller 320 may receive execution information in response to the request information from the content provider 400 (S1103). The execution information may be changed according to the request information. For example, when the request information is a content search request, the execution information may be a content search result. For example, when the request information is a content play request, the execution information may be content play. For example, when the request information is a control command related to the content image displayed on the display 340, the execution information may be an execution result of the control command.

The controller 320 may control an operation according to the execution information (S1104). For example, when the execution information is a content search result, the controller 320 may control the display 340 to display the content search result. For example, when the execution information is content play, the controller 320 may control the display 340 to reproduce the corresponding content image. For example, when the execution information is an execution result of a control command, the controller 320 may control the display 340 to re-display the content image to which the execution result of the control command is applied. For example, when the request information is to increase the volume of the content image displayed on the display 340 by +5 from the current volume value, the content provider 400 may increase the volume of the corresponding content image by +5, and the controller 320 may receive the content image with the volume increased by +5 and may perform control to re-display the content image. Thus, the content image with the volume increased by +5 from a previous volume may be displayed on the display 340.

When a corresponding utterance is not an utterance for the content image displayed on the display 340 (S1101), the controller 320 may acquire information on whether a specific content provider is included in the utterance (S1105).

When the specific content provider is included in the utterance, the controller may transfer request information corresponding to the utterance to a specific content provider (S1106).

For example, when an utterance is received while Netflix is not currently displayed on the display and the corresponding utterance includes "Netflix", the controller may transfer the request information corresponding to the utterance to Netflix (content provider).

When the content image displayed on the display 340 is not displayed or the specific utterance does not include the specific content provider, the controller 320 may proceed to S1121 and may perform a corresponding operation, which will be described in detail with reference to FIG. 17.

Figure 13:
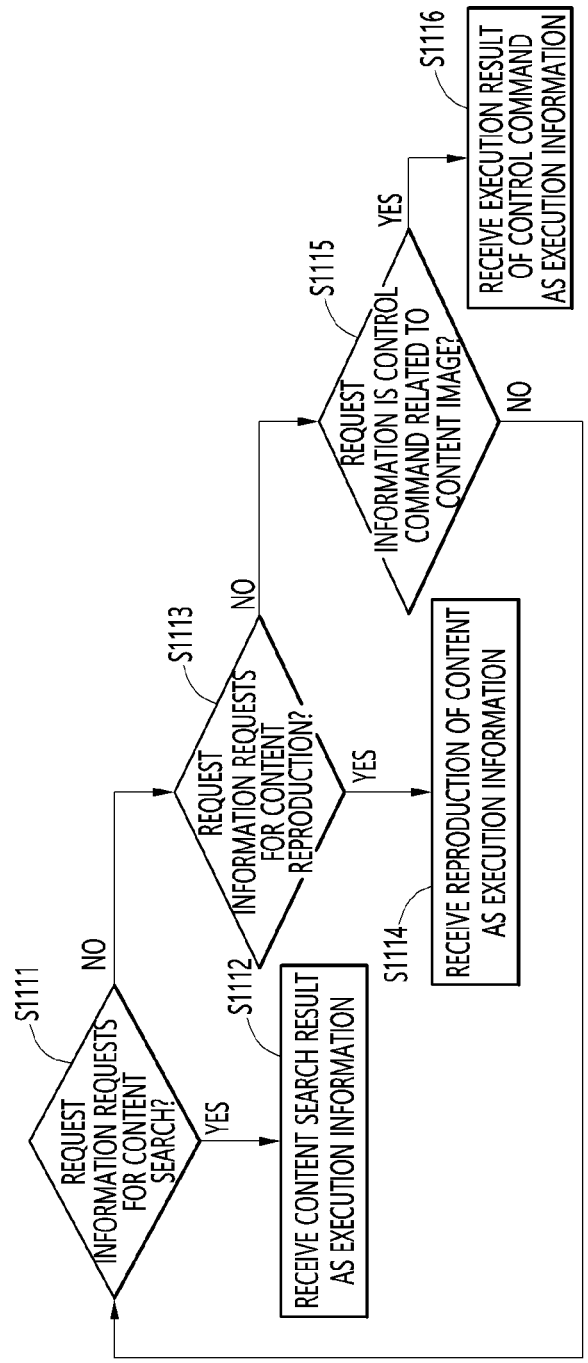
FIG. 13 is a flowchart for explaining an execution result by a content provider based on request information in a display device according to an embodiment.

FIG. 13 is a flowchart for explaining an execution result by a content provider based on request information in a display device according to an embodiment. FIG. 13 is a diagram showing S1102 and S1103 in FIG. 12 in more detail.

Referring to FIG. 13, when request information is a content search request (S1111), the controller 320 may receive the content search result as execution information (S1112).

Figure 15:
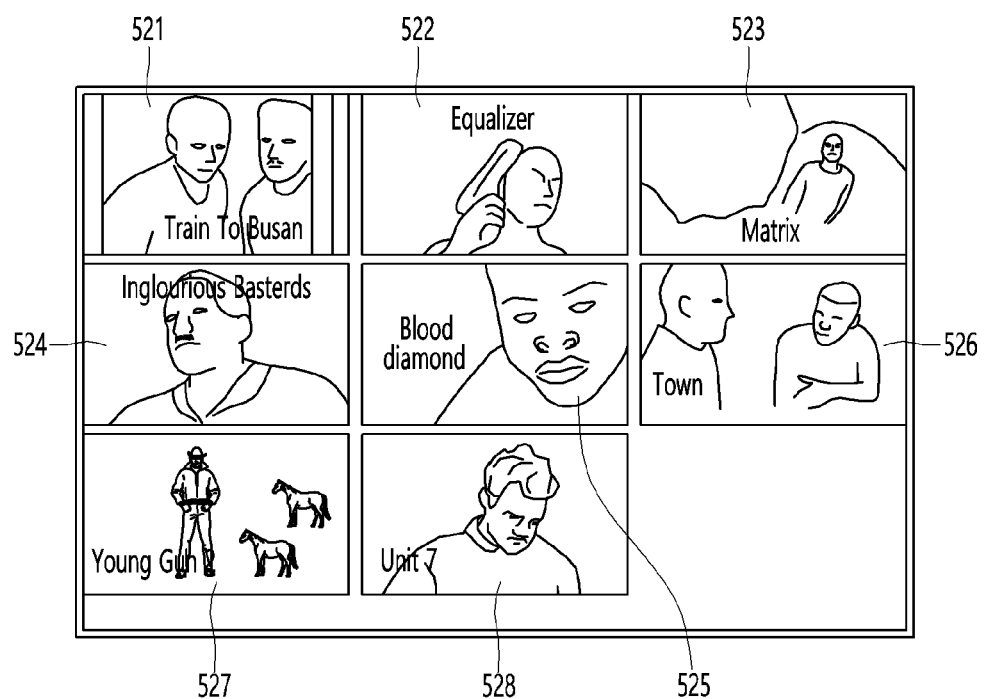
FIG. 15 is a diagram showing the state in which a content search result is displayed on a display in response to request information.

As shown in FIG. 15, when receiving an utterance of "Find Winner for Violent Action Movie" while specific content is reproduced through a Netflix application, the controller 320 may transfer request information corresponding to the corresponding utterance to Netflix (the content provider 400), may receive the search result of "Winner for Violent Action Movie" from the Netflix, and may control the display 340 to display the received search results 521 to 528. As shown in FIG. 15, 8 search results may be displayed on the display 340. The search result may be displayed in a short image or a thumbnail image but the embodiments are not limited thereto. The short image or the thumbnail image may be a still cut image representing corresponding content.

When the request information is a content play request (S1113), the controller 320 may receive reproduction of content as execution information (S1114).

Figure 16:
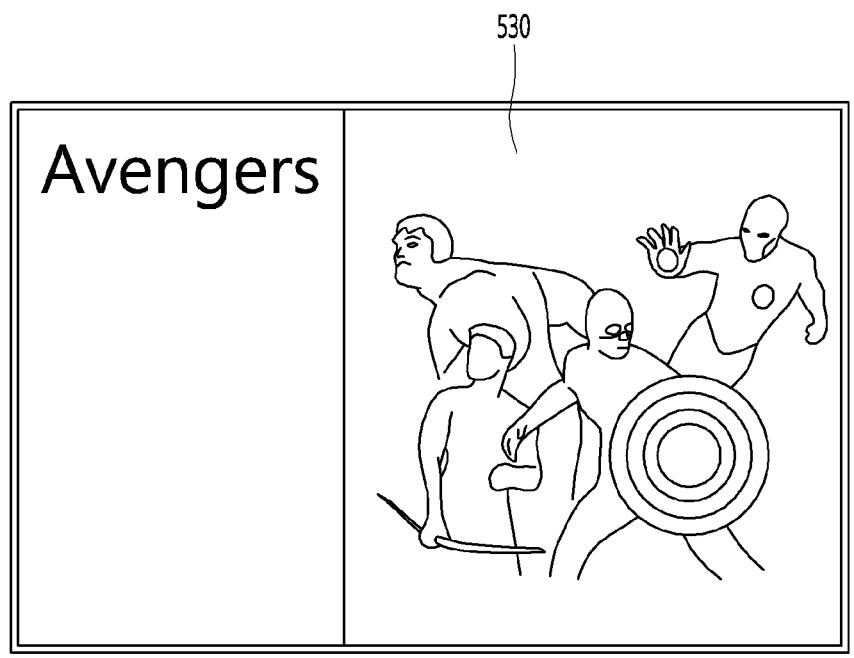
FIG. 16 is a diagram showing the state in which a content image is reproduced on a display in response to request information.

As shown in FIG. 16, when receiving an utterance of "Play Avengers" while specific content is reproduced through the Netflix application, the controller 320 may transfer request information corresponding to the corresponding utterance to Netflix (the content provider 400) and may reproduce "Avengers" as the execution information about "Play Avengers" from Netflix in a streaming form, and the controller 320 may receive "Avengers" in a streaming form and may control the display 340 to reproduce (530) "Avengers" in a streaming form.

When the request information is a control command related to a content image (S1115), the controller 320 may receive the execution result of the control command as the execution information (S1116). Control related to the content image has been described above, and thus a detailed description is omitted.

Figure 17:
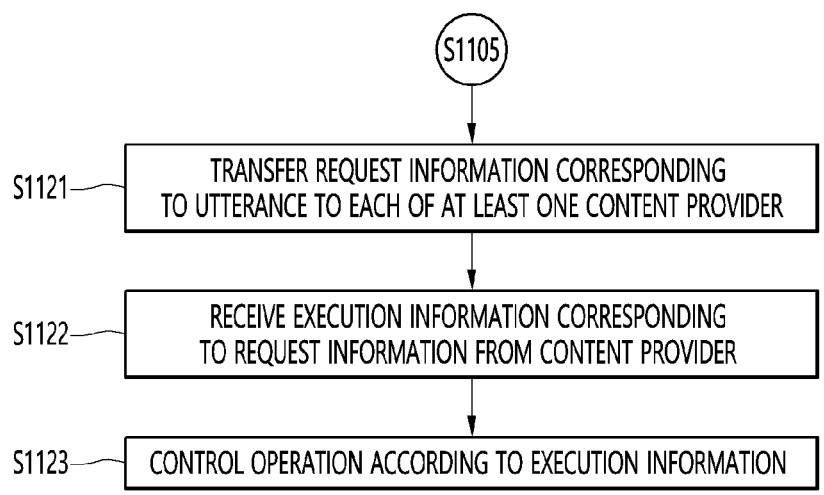
FIG. 17 is a flowchart for explaining a second control method in a display device according to an embodiment.

FIG. 17 is a flowchart for explaining a second control method in a display device according to an embodiment.

Referring to FIGS. 6 and 17, the controller 320 may transfer request information corresponding to an utterance to each of at least one of the content providers CP1 to CP8 (S1121). Here, the content providers CP1 to CP8 may be the content provider shown in FIGS. 5 and 6.

For example, when receiving an utterance in the state in which a content image is not displayed on the display 340, the controller 320 may transfer request information corresponding to the corresponding utterance to, for example, each of at least one of the content providers CP1 to CP8 of the display device 300. Here, at least one of the content providers CP1 to CP8 may be a content provider that installs a content provider application in the display device 300. In this case, the controller 320 may acquire an address of the content providers CP1 to CP8 to which request information corresponding to the utterance is to be transmitted, based on information on the installed content provider application and may transfer request information corresponding to the utterance to each of at least one of the content providers CP1 to CP8 through the corresponding address.

In another example, when the display device 300 has a content server that is autonomously established, the controller 320 may transfer the request information corresponding to the utterance to the corresponding content server. The controller 320 may also transfer the request information corresponding to the utterance to each of at least one of the content providers CP1 to CP8 and the content server.

The controller 320 may receive execution information in response to the request information from the content providers CP1 to CP8 (S1122).

The controller 320 may control an operation according to the received execution information (S1123).

For example, when receiving the content search result from at least one of the content providers CP1 to CP8, the controller may align content search results received from each of at least one of the content providers CP1 to CP8 and may control the display 340 to display the aligned content search results.

For example, when content play is received from at least one of the content providers CP1 to CP8 and there is one content play received from at least one of the content providers CP1 to CP8, the controller 320 may control the display 340 to reproduce the corresponding content.

For example, when content play is received from at least one of the content providers CP1 to CP8 and there are two or more content plays received from at least one of the content providers CP1 to CP8, the controller 320 may control the display 340 to reproduce content received from the content provider set as the highest priority reproduction according to a preset priority, but the embodiments are not limited thereto.

Figure 18:
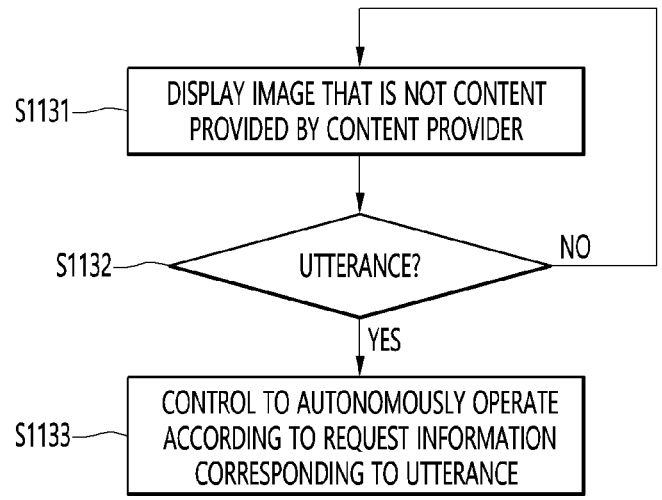
FIG. 18 is a flowchart for explaining a third control method in the display device 300 according to an embodiment.

FIG. 18 is a flowchart for explaining a third control method in the display device 300 according to an embodiment.

Referring to FIGS. 6 and 18, the controller 320 may control the display 340 to display an image that is not content provided by the content providers CP1 to CP8 (S1131).

The image that is not the content provided by the content providers CP1 to CP8 may be, for example, various broadcast images received through airwaves, cables, satellites, or IPTV or a picture image having a frame function. While a broadcast image or a content image is not displayed on the display 340, a picture image may be displayed on the display 340 as a still image or a video image to perform a frame function.

When receiving an utterance (S1132), the controller 320 may perform control to autonomously operate according to request information corresponding to the utterance (S1133).

When receiving an utterance while an image that is not the content provided by the content providers CP1 to CP8 is displayed on the display 340, the controller 320 may not recognize a content provider to which the request information corresponding to the corresponding utterance is transmitted, among the content providers CP1 to CP8. In this case, the controller 320 may request information control the request information corresponding to the corresponding utterance to autonomously operate. For example, when the request information is content search or content reproduction, the controller 320 may transfer the request information corresponding to the utterance to a content server that is autonomously established and may control the display 340 to display the corresponding content search result or reproduce specific content.

Figure 19:
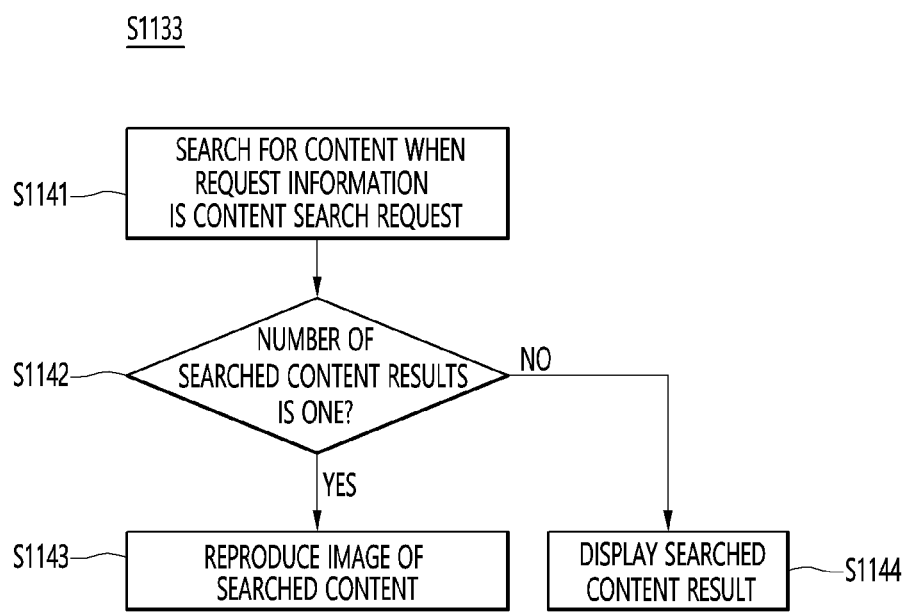
FIG. 19 is a flowchart for explaining a content control method of a content result searched in FIG. 18.

FIG. 19 is a flowchart for explaining a content control method of a content result searched in FIG. 18. FIG. 19 is a diagram for explaining S1133 in FIG. 18 in detail.

Referring to FIGS. 6, 18, and 19, when request information is a content search request, the controller 320 may search for content in response to the content search request through a content server and may acquire a content search result (S1141).

When there is one content included in the content search result (S1142), the controller 320 may directly reproduce an image of the content included in the content search result rather than displaying the content search result (S1143).

When there are two or more contents included in the content search result, the controller 320 may control the display 340 to display the content search result (S1144).

The above description is merely illustrative of the technical spirit of the present disclosure, and various modifications and variations will be possible without departing from the essential features of the present disclosure by those skilled in the art to which the present disclosure pertains.

Therefore, the embodiments disclosed in the present disclosure are not intended to limit the technical spirit of the present disclosure, but to explain, and the scope of the technical spirit of the present disclosure is not limited by these embodiments.

The scope of the present disclosure should be interpreted by the following claims, and all technical spirits within the scope equivalent thereto should be construed as being included in the scope of the present disclosure.

INDUSTRIAL AVAILABILITY

Embodiments may be used in a machine or a device including a display device.

The invention claimed is:
1. A display device comprising:
 a network interface configured to communicate with at least one content provider (CP);
 a memory configured to store a CP application of each of the at least one CP;
 a display configured to display a content image through a first CP application of the at least one CP; and
 a controller configured to: in response to receiving an utterance during display of the content image through the first CP application:
 recognizing that the utterance is an utterance for the displayed content image;
 based on recognizing that the utterance is for the displayed content image, control the network interface to transfer request information corresponding to the utterance to a first CP that provides the first CP application;
 transfer a first parameter including the utterance as a specific parameter to the first CP for responding to the request information;
 transmit the utterance to a natural language processing server;
 acquire keyword information and intent information corresponding to the utterance from the natural language processing server; and
 transfer a second parameter including keyword information and intent information to the first CP,
 wherein the controller is further configured to:
 in response to receiving the utterance, determine a current state of the display is a first state, a second state, or a third state, wherein the first state is a state in which the content image is displayed on the display, the second state is a state in which the content image is not displayed on the display, and the third state is a state in which a picture image is displayed on the display;
 based on the determined state of the display, transfer request information corresponding to the utterance to one content provider, a plurality of content providers, or a content server that is autonomously established;
 receive execution information corresponding to the request information from at least one content provider or the content server; and
 control an operation according to the received execution information,
 wherein based on the determined state of the display being the first state, the request information corresponding to the utterance is transferred to the content provider that provides the content image displayed on the display,
 wherein based on the determined state of the display being the second state, the request information corresponding to the utterance is transferred to all content providers obtained based on information on pre-installed content provider applications, and
 wherein based on the determined state of the display being the third state, the request information corresponding to the utterance is transferred to the content server that is autonomously established.

2. The display device of claim 1, wherein the first CP application is operated in a foreground on the display.

3. The display device of claim 1, wherein the request information is Speech-To-Text (STT)-based character data about the utterance.

4. The display device of claim 1, wherein, when the request information is a content search request, the execution information is a content search result.

5. The display device of claim 1, wherein, when the request information is a content play request, the execution information is content play.

6. The display device of claim 1, wherein, when the request information is a control command related to the displayed content image, the execution information is an execution result of the control command.

7. The display device of claim 6, wherein the controller controls the display to re-display the displayed content image according to information on execution of the control command.

8. The display device of claim 1, wherein, when the utterance includes voice about a second CP application of the at least one CP application, the controller controls the network interface to transfer the request information corresponding to the utterance to a second CP that provides the second CP application.

9. The display device of claim 8, wherein the second CP application is in one state of being operated in a foreground on the display, being operated in a background, and not being executed on the display.

10. The display device of claim 1, wherein:
 the request information is a content search request,
 the controller searches for content according to the request information, and
 when a number of the search content result is one, the controller controls the display to reproduce an image of the searched content.

11. A method of controlling a display device, the method comprising:
 receiving an utterance,
 determining whether a content image is being displayed on a display of the display device,
 wherein based on the utterance being received while the content image is being displayed through a first CP application of at least one CP application:
 recognizing that the utterance is an utterance for the displayed content image;
 based on recognizing that the utterance is for the displayed content image, transferring request information corresponding to the utterance to a first content provider (CP) that provides the first CP application, wherein the transferring request information comprises:

transferring a first parameter including the utterance as a specific parameter to the first CP for responding to the request information;

transmitting the utterance to a natural language processing server;

acquiring keyword information and intent information corresponding to the utterance from the natural language processing server; and transferring a second parameter including keyword information and intent information to the first CP, wherein transferring the request information further comprises:

determining, in response to receiving the utterance, whether a current state of the display is a first state, a second state, or a third state, wherein the first state is a state in which the content image is displayed on the display, the second state is a state in which the content image is not displayed on the display, and the third state is a state in which a picture image is displayed on the display;

based on the determined state of the display, transferring the request information corresponding to the utterance to one content provider, a plurality of content providers, or a content server that is autonomously established;

receiving execution information corresponding to the request information from at least one content provider or the content server; and controlling an operation according to the received execution information, wherein based on the determined state of the display being the first state, the request information corresponding to the utterance is transferred to the content provider that provides the content image displayed on the display, wherein based on the determined state of the display being the second state, the request information corresponding to the utterance is transferred to all content providers obtained based on information on pre-installed content provider applications, and wherein based on the determined state of the display being the third state, the request information corresponding to the utterance is transferred to the content server that is autonomously established.

12. The method of claim 11, further comprising:

when the utterance includes voice about a second CP application of the at least one CP application, transferring the request information corresponding to the utterance to a second CP that provides the second CP application.

* * * * *